United States Patent
Xu

(10) Patent No.: US 12,307,778 B1
(45) Date of Patent: May 20, 2025

(54) DYNAMIC ADJUSTMENT OF SENSOR RANGE USING COMPUTER VISION

(71) Applicant: Ambarella International LP, Santa Clara, CA (US)

(72) Inventor: Ruian Xu, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 476 days.

(21) Appl. No.: 17/897,139

(22) Filed: Aug. 27, 2022

(51) Int. Cl.
| | |
|---|---|
| *G06K 9/00* | (2022.01) |
| *G06V 10/20* | (2022.01) |
| *G06V 10/25* | (2022.01) |
| *G06V 20/40* | (2022.01) |
| *G06V 20/54* | (2022.01) |

(52) U.S. Cl.
CPC .............. *G06V 20/54* (2022.01); *G06V 10/25* (2022.01); *G06V 10/255* (2022.01); *G06V 20/46* (2022.01); *G06V 2201/07* (2022.01); *G06V 2201/08* (2022.01)

(58) Field of Classification Search
None
See application file for complete search history.

(56) References Cited

U.S. PATENT DOCUMENTS

| | | | |
|---|---|---|---|
| 2018/0061239 A1* | 3/2018 | Prasad | G01S 13/867 |
| 2021/0405185 A1* | 12/2021 | Price | G01S 13/931 |

FOREIGN PATENT DOCUMENTS

| | | | |
|---|---|---|---|
| DE | 102021004633 A1 * | 2/2022 | B60R 9/06 |

\* cited by examiner

*Primary Examiner* — Molly Wilburn
*Assistant Examiner* — Aidan Keup
(74) *Attorney, Agent, or Firm* — Maiorana Patent Law, PA

(57) ABSTRACT

An apparatus comprising an interface, a sensor and a processor. The interface may receive pixel data of an exterior of a vehicle. The sensor may detect an obstacle at a distance from the vehicle. The processor may process the pixel data arranged as video frames, perform computer vision operations on the video frames to detect objects, determine whether one of the objects is a vehicle attachment, determine an amount of distance that the vehicle attachment extends a size of the vehicle and generate a recalibration value for the distance used by the sensor in response to the amount of distance. A notification may be generated in response to the sensor detecting the obstacle within the distance. The distance may be a default value based on the size of the vehicle when the vehicle attachment is not present and the recalibration value when the vehicle attachment is detected.

20 Claims, 11 Drawing Sheets

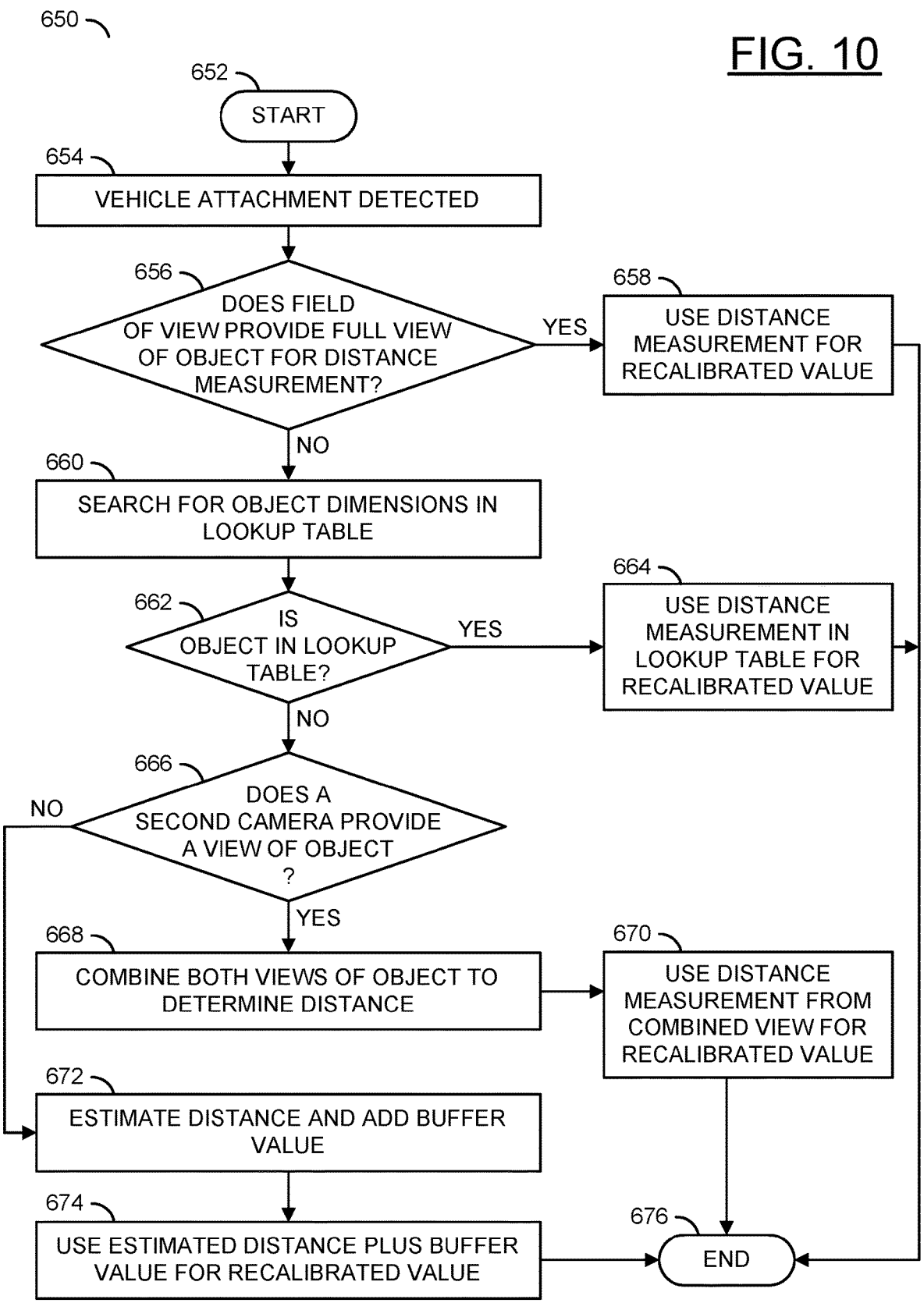

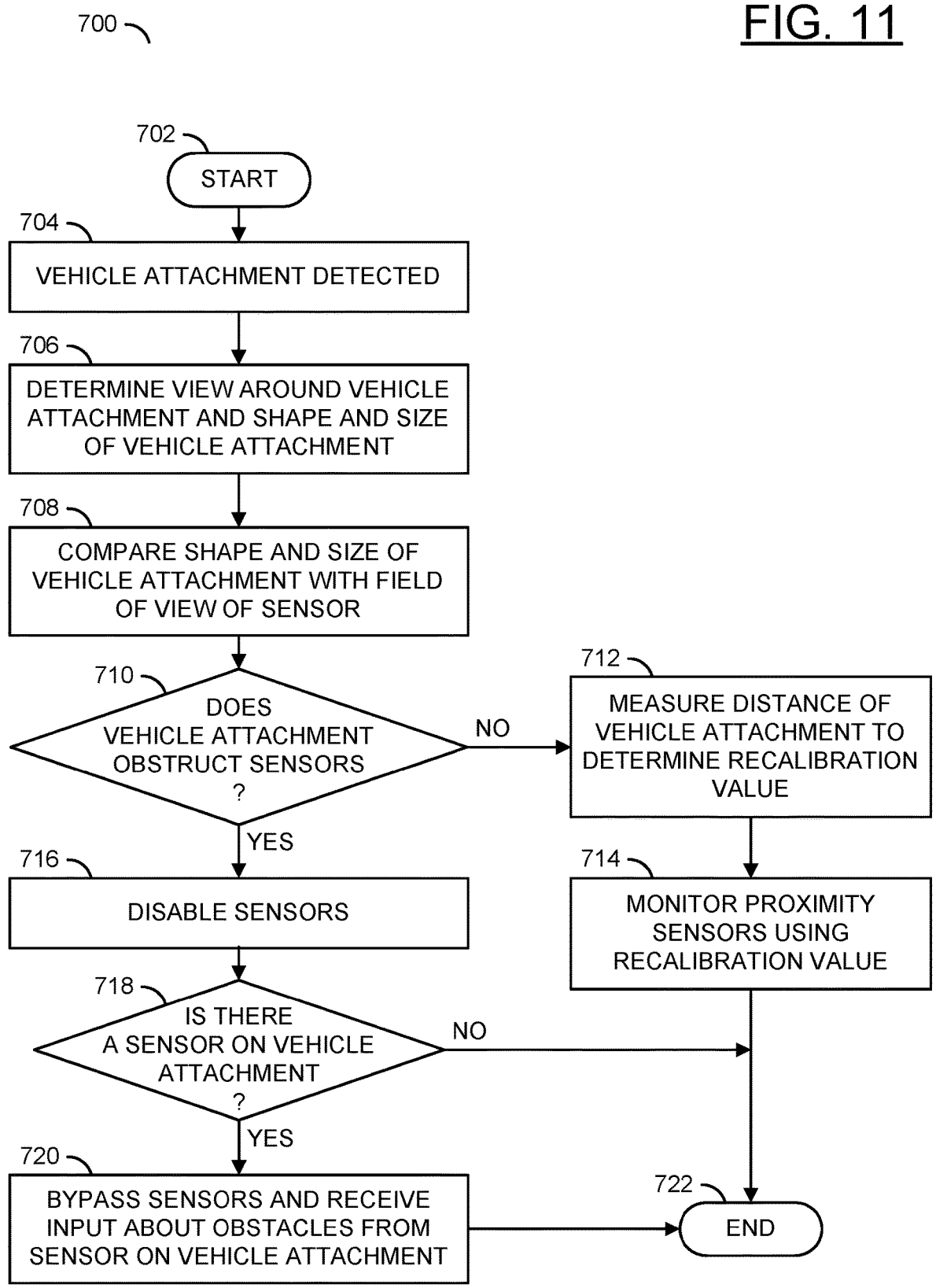

DYNAMIC ADJUSTMENT OF SENSOR RANGE USING COMPUTER VISION

FIELD OF THE INVENTION

The invention relates to vehicle sensors generally and, more particularly, to a method and/or apparatus for implementing dynamic adjustment of sensor range using computer vision.

BACKGROUND

Modern vehicles rely on a suite of sensors to aid drivers. The suite of sensors provides additional information about the surroundings of the vehicle that may not be easily visible by the driver. The suite of sensors also provides information that can be used to provide warnings.

The suite of sensors equipped by vehicles can include ultra-sound sensors, radar sensors and backup cameras. Ultra-sound and radar sensors can provide warnings and backup cameras capture video in order to assist and warn the driver. In an example, a warning can be generated in a scenario where the car is on track to collide with an obstacle (i.e., an obstacle in the path of the car driving in reverse).

Conventional vehicle sensors do not take into account various modifications to the vehicle that users make. Consumers routinely add a tow hitch to a vehicle. A tow hitch is commonly used to mount equipment such as bike racks or storage containers in order to transport bicycles and other equipment. When a tow hitch is mounted, depending on the equipment that is added (i.e., a bicycle), the sensor suite installed on a vehicle can mistake the intentionally attached items as a potential obstacle. For example, a bicycle mounted to a rear of a vehicle might be detected as a potential object in the path of a vehicle driving in reverse. The intentionally mounted items might result in warnings (i.e., audible, visual, etc.) generated by the sensor suite. When the sensor suite erroneously detects intentionally attached objects as potential hazard, the feature no longer assists the user, and instead becomes a source of annoyance. Some vehicle owners resort to disabling important safety features when the safety feature becomes an annoyance.

It would be desirable to implement dynamic adjustment of sensor range using computer vision.

SUMMARY

The invention concerns an apparatus comprising an interface, a sensor and a processor. The interface may be configured to receive pixel data corresponding to an exterior of a vehicle. The sensor may be configured to detect an obstacle at a pre-determined distance from the vehicle. The processor may be configured to process the pixel data arranged as video frames, perform computer vision operations on the video frames to detect objects in the video frames, determine whether one of the objects detected is a vehicle attachment, determine an amount of distance that the vehicle attachment extends a size of the vehicle and generate a recalibrated value for the pre-determined distance from the vehicle used by the sensor for detecting the obstacle in response to the amount of the distance. A notification may be generated in response to the sensor detecting the obstacle within the pre-determined distance. The pre-determined distance may be a default value based on the size of the vehicle when the vehicle attachment is not present and the recalibrated value when the vehicle attachment is detected.

BRIEF DESCRIPTION OF THE FIGURES

Embodiments of the invention will be apparent from the following detailed description and the appended claims and drawings.

FIG. 10 is a flow diagram illustrating a method for determining a distance of a vehicle attachment from a rear end of a vehicle.

FIG. 11 is a flow diagram illustrating a method for disabling sensors obstructed by a vehicle attachment.

DETAILED DESCRIPTION OF THE EMBODIMENTS

Figure 1:
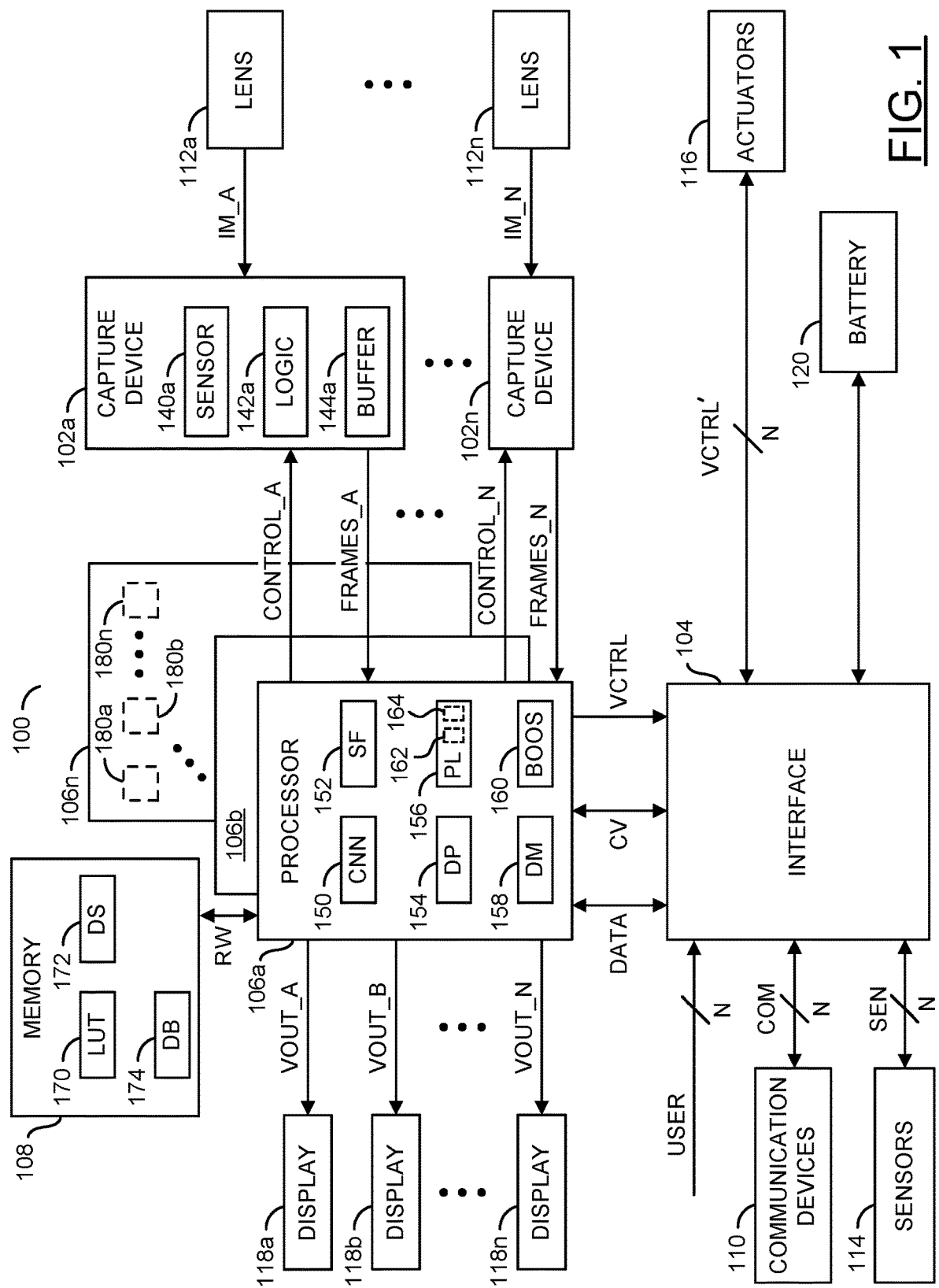
FIG. 1 is a diagram illustrating an embodiment of the present invention.

Embodiments of the present invention include providing dynamic adjustment of sensor range using computer vision that may (i) be implemented with a vehicle sensor suite, (ii) adjust a sensor range in response to detecting a vehicle attachment, (iii) suppress alerts determined to be unnecessary based on objects detected, (iv) determine an effective size of a vehicle that includes a vehicle attachment, (v) use computer vision to adjust range sensors, (vi) classify objects as vehicle attachments, (vii) determine whether a vehicle attachment is present based on whether the object moves with respect to the vehicle over time and/or (viii) be implemented as one or more integrated circuits.

Embodiments of the present invention may be configured to implement computer vision in order to adjust a detection range of various sensors. Capture devices may be configured to capture pixel data that provides a view of an exterior area around a vehicle (e.g., provide a perspective view from a vehicle). The pixel data may be arranged as video frames to enable the computer vision operations to be performed. The computer vision operations may be configured to determine whether objects detected comprise a vehicle attachment. The vehicle attachment may be an object that effectively extends a size of the vehicle. In an example, the vehicle attachment may be a bike rack, a bicycle, a cargo carrier, a camera rig (for filming a TV or movie scene), a ski mount, skis, etc.

Embodiments of the present invention may be implemented for rearview cameras (e.g., backup cameras), front-facing cameras (e.g., for an Advanced Driver Assistance System (ADAS)), and or other vehicle-mounted cameras. In response to detecting the vehicle attachment, the detection range of the other sensor suites integrated into the vehicle (e.g., ultra-sound sensors, radar sensors, LIDAR sensors, etc.) may be dynamically adapted. Dynamically adapting the detection range of other sensor suites may enable the sensor suite to continue providing functionality based on an updated effective size of the vehicle.

Embodiments of the present invention may be configured to perform object detection and/or recognition. The computer vision operations may process the input from one or more of the cameras implemented by the ego vehicle. In response to detecting the vehicle attachment using the computer vision operations, the effective size increase of the vehicle may be determined. In an example, when a bicycle is attached to the ego vehicle using a bike rack mount on the rear of the ego vehicle, the rear end of the ego vehicle may be extended an additional distance (e.g., approximately 1.5 feet). A default (e.g., factory set) sensor detection warning distance/range may be adjusted in response to determining the additional distance that the bike rack mount extends the rear end of the vehicle (e.g., the effective size of the vehicle).

After the detection range of the sensor suite has been adjusted, the sensor suite may operate (e.g., generate a warning for a backup range sensor) based on the recalibrated extended range (e.g., so that the bike and rack would not hit an obstacle, instead of detecting with respect to the rear bumper using the default settings). After the sensors have been recalibrated in response to detecting a vehicle attachment, the computer vision operations may continue to monitor the object(s) attached to the vehicle. When the computer vision operations detect that the vehicle attachment(s) have been unmounted (e.g., the bicycle has been removed) embodiments of the present invention may re-adjust the detection range of the sensor suite. For example, after a bicycle mount has been removed, the detection range of the sensor suite may be reverted back to the default distance settings.

Embodiments of the present invention may be configured to detect vehicle attachments added to the rear-end of the vehicle. In some embodiments, (e.g., for buses that provide public transportation), the vehicle attachment (e.g., a bike rack) may be mounted to the front of the vehicle (e.g., to hold the bicycles of bus riders) and the dynamic adjustment may be applied to the front of the vehicle and/or other cameras integrated into the ego vehicle. In some embodiments, the vehicle attachment may be a cargo carrier attached using a tow hitch, which may be accounted for using the computer vision operations. In some embodiments, the vehicle attachment may be a ski mount attached to a rear end of the ego vehicle.

In some embodiments, the video frames captured may not capture a perspective that provides a complete view of the vehicle attachment. For example, for a bicycle, the video frames may not capture the handlebars, which may extend out farther than a field of view of the video frame and/or a body of the vehicle. Embodiments of the present invention may determine the additional distance and/or add a buffer (or margin) distance amount in case a portion of the vehicle attachment that is not visible extends further than the portion of the vehicle attachment detected. In some embodiments, a lookup table may be implemented that comprises sizes of known vehicle attachments.

Referring to FIG. 1, a diagram illustrating an embodiment of the present invention is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuit 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be a component separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processor 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112*a*-112*n*, each of the lenses 112*a*-112*n* may point in a different direction. By having each of the lenses 112*a*-112*n* capture a different direction, the apparatus 100 may capture a panoramic view of the environment and/or the interior of a vehicle. The lenses 112*a*-112*n* may be arranged to capture fields of view above and/or below a level of the vehicle. In some embodiments, the lenses 112*a*-112*n* may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118*a*-118*n*).

Each of the capture devices 102*a*-102*n* may comprise one of blocks (or circuits) 140*a*-140*n*, one of blocks (or circuits) 142*a*-142*n* and/or one of blocks (or circuits) 144*a*-144*n*. The blocks 140*a*-140*n* may implement an image sensor (e.g., a camera sensor). The blocks 142*a*-142*n* may implement logic. The blocks 144*a*-144*n* may implement a buffer. For clarity, in the example shown, only the image sensor 140*a*, the logic 142*a* and the buffer 144*a* of the capture device 102*a* are shown. The capture devices 102*a*-102*n* may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102*a*-102*n* may each be configured to generate raw pixel data in response to the signals IM_A-IM_N (e.g., perform a photoelectric conversion). The capture devices 102*a*-102*n* may be configured to present pixel data as an analog signal or as a digital signal (e.g., perform an analog to digital conversion). The capture devices 102*a*-102*n* may capture data received through the lenses 112*a*-112*n* to generate raw pixel data and/or video image data. In an example, the capture devices 102*a*-102*n* may present the raw pixel data in Bayer pattern, RGB, or YUV formats. In some embodiments, the capture devices 102*a*-102*n* may generate video frames. In some embodiments, the capture devices 102*a*-102*n* may generate raw pixel data and the processors 106*a*-106*n* may generate the video frames from the raw pixel data.

The signals FRAMES_A-FRAMES_N may comprise raw pixel data, video frames and/or still images generated by the capture devices 102*a*-102*n* (e.g., video data). In the example shown, the signals FRAMES_A-FRAMES_N (e.g., video frames) may be communicated from the capture devices 102*a*-102*n* to the processors 106*a*-106*n*. In another example, signals comprising the raw pixel data may be communicated from the capture devices 102*a*-102*n* to the processors 106*a*-106*n* and the processors 106*a*-106*n* may generate the signals FRAMES_A-FRAMES_N (e.g., the signals FRAMES_A-FRAMES_N may be generated internal to the processors 106*a*-106*n*). In some embodiments, the capture devices 102*a*-102*n* may be directly connected to the processors 106*a*-106*n*. In some embodiments, the capture devices 102*a*-102*n* may be connected to the processors 106*a*-106*n* by respective cables. In an example, the capture devices 102*a*-102*n* may be connected to the processors 106*a*-106*n* using a serial communication protocol between serializer-deserializer pairs.

In some embodiments, the capture devices 102*a*-102*n* and/or the processors 106*a*-106*n* may be configured to perform depth sensing (e.g., the signals FRAMES_A-FRAMES_N may comprise depth information and/or vector light data in addition to the video frames). In one example, the capture devices 102*a*-102*n* and/or the processors 106*a*-106*n* may perform depth sensing using multiple cameras (e.g., cameras configured as a stereo pair to capture a depth map). In another example, the capture devices 102*a*-102*n* and/or the processors 106*a*-106*n* may perform depth sensing using time-of-flight. In yet another example, the capture devices 102*a*-102*n* and/or the processors 106*a*-106*n* may perform depth sensing using structured light.

The video frames FRAMES_A-FRAMES_N may be presented to one or more of the processors 106*a*-106*n*. The signals CONTROL_A-CONTROL_N may comprise instruction signals for the capture devices 102*a*-102*n* and/or the lenses 112*a*-112*n* (e.g., to zoom, pan, focus, adjust settings, etc.). The signals CONTROL_A-CONTROL_N may be generated by the processors 106*a*-106*n*.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106*a*-106*n*. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106*a*-106*n* and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106*a*-106*n* for the various vehicle actuators 116. The signal CV may represent computer vision data. The signal DATA may represent other data. The number of signals communicated and/or the types of data communicated using the interface 104 may be varied according to the design criteria of a particular implementation.

The processors 106*a*-106*n* may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural networks (ANNs) configured to provide artificial intelligence and/or computer vision operations. In an example, the one or more ANNs may comprise a convolutional neural network (CNN) module and/or a generative adversarial network (GAN) trained to provide images processing, object detection, object recognition, object classification, etc. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may implement a low-power system-on-a-chip (SoC). The processors 106a-106n may provide artificial intelligence (AI), advanced image signal processing and high-resolution video compression. The processors 106a-106n may be configured to perform processing locally to enable the apparatus 100 to be implemented in edge devices. The processors 106a-106n may enable edge devices to visually perceive the environment and make decisions based on the data collected from the capture devices 102a-102n and other types of sensors (e.g., the sensors 114). The architecture of the video processing pipeline 156 may enable the processors 106a-106n to support a variety of computer vision processes, such as: object detection, classification and tracking, semantic and instance segmentation, image processing, stereo object detection, terrain mapping, face recognition, etc.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The processors 106a-106n may comprise an interface configured to receive pixel data, video frames, audio data, sensor data, data from external sources, etc. In an example, the interface of the processors 106a-106n may be configured to enable Gigabit Ethernet, a USB 2.0 host and device, multiple (e.g., three) SD card controllers with SDXC support and/or MIPI-DSI/CSI output. The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, a passive infrared (PIR) sensor, a thermometer, a gyroscope, a compass, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n.

In one example, the capture devices 102a-102n may provide a direct connection to the processors 106a-106n. For example, the processors 106a-106n may be configured to receive triple-sensor video input with high-speed SLVS/MIPI-CSI/LVCMOS interfaces. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The ANNs 150 may be configured to implement various artificial intelligence models. In the example shown, the ANNs 150 may be described as a convolutional neural network module. For simplicity, the ANNs 150 may be described as the CNN module 150. However, other types of artificial intelligence models may be implemented.

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of objects to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding (e.g., 4KP30 AVC and HEVC encoding with multi-stream support) and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The video pipeline module 156 may enable multi-stream support (e.g., generate multiple bitstreams in parallel, each comprising a different bitrate). In an example, the video pipeline module 156 may implement an image signal processor (ISP) with a 320 MPixels/s input pixel rate. The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine 164 may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. In one example, the hardware modules 180a-180n may be configured to implement various security features (e.g., secure boot, I/O virtualization, etc.). The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n (e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180a may schedule the operators based on when the operators may be ready to be processed by the hardware engines 180a-180n.

The scheduler circuit 180a may time multiplex the tasks to the hardware modules 180a-180n based on the availability of the hardware modules 180a-180n to perform the work. The scheduler circuit 180a may parse the directed acyclic graph into one or more data flows. Each data flow may include one or more operators. Once the directed acyclic graph is parsed, the scheduler circuit 180a may allocate the data flows/operators to the hardware engines 180a-180n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 180a-180n and/or the CNN module 150 may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron (or node) in one layer to every neuron (or node) in the other layer. In a fully-connected layer, for n inputs and m outputs, there are $n*m$ weights. There may also be a bias value for each output neuron (or node), resulting in a total of $(n+1)*m$ parameters. An activation function may also be implemented. The activation function may convert an output from the nodes of one layer into an input for the nodes of a next layer. The activation function may provide constraints to the output of a node (e.g., prevent computational issues caused by large values). The activation function may provide non-linearity to the neural network. The non-linearity provided by the activation function may enable classifications of patterns with a high degree of complexity (e.g., highly complex patterns for computer vision). In one example, the activation function may implement a ReLU function.

In an already-trained neural network, the $(n+1)*m$ parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

One or more of the dedicated hardware modules 180a-180n may be configured to extract feature points from the video frames. The CNN module 150 may be configured to analyze pixels of the video frames and/or groups of pixels of the video frame. One or more of the dedicated hardware modules 180a-180n may be configured to perform particular mathematical operations that may be performed multiple times to perform the analysis of the pixels and/or groups of pixels. The operations performed by the dedicated hardware modules 180a-180n may be configured to calculate descriptors based on the feature points. The dedicated hardware modules 180a-180n may be configured to compare the descriptors to reference descriptors stored in the memory 108 to determine whether the pixels of the video frames correspond to a particular object.

Figure 2:
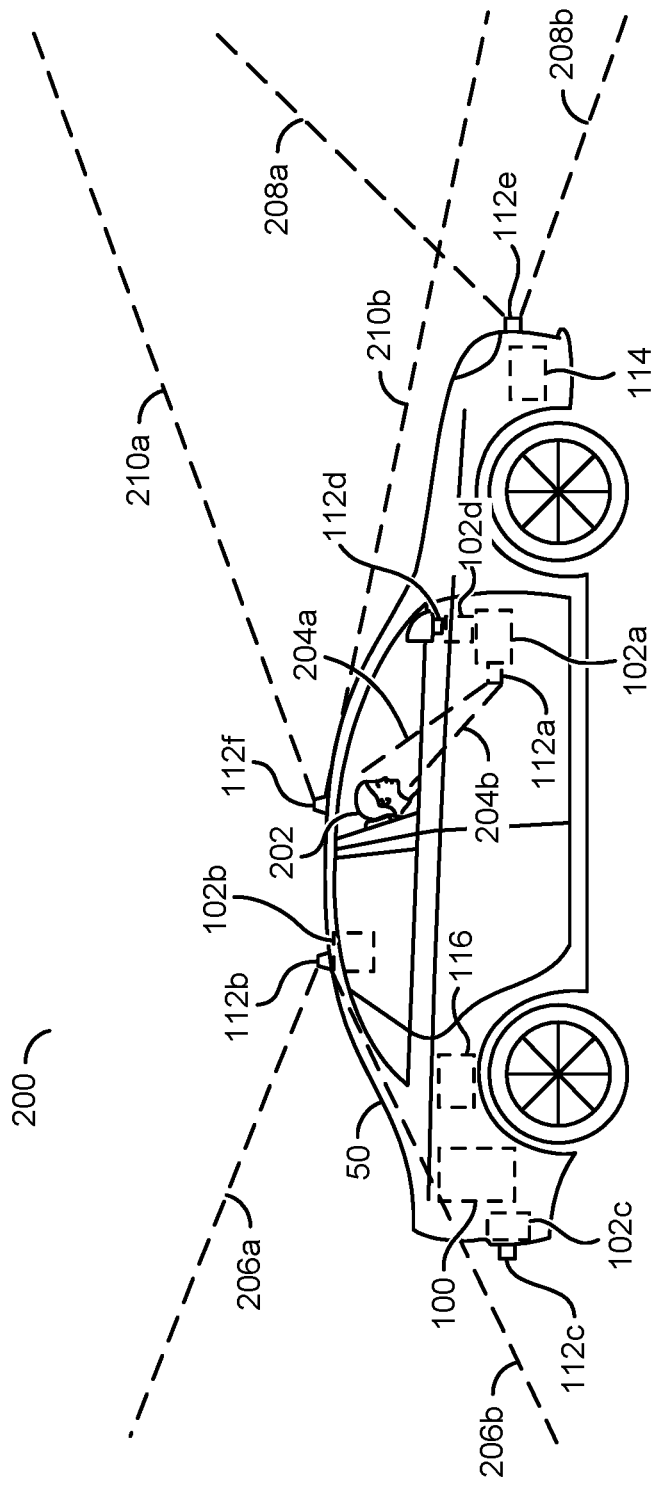
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the capture device 102c, the lens 112d and the capture device 102d, etc.). For example, the targeted view (e.g., represented by a line 208a and a line 208b captured by the lens 112e) may provide a front exterior view of an area. In another example, a redundant targeted view (e.g., represented by a line 210a and a line 210b captured by the lens 112f) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
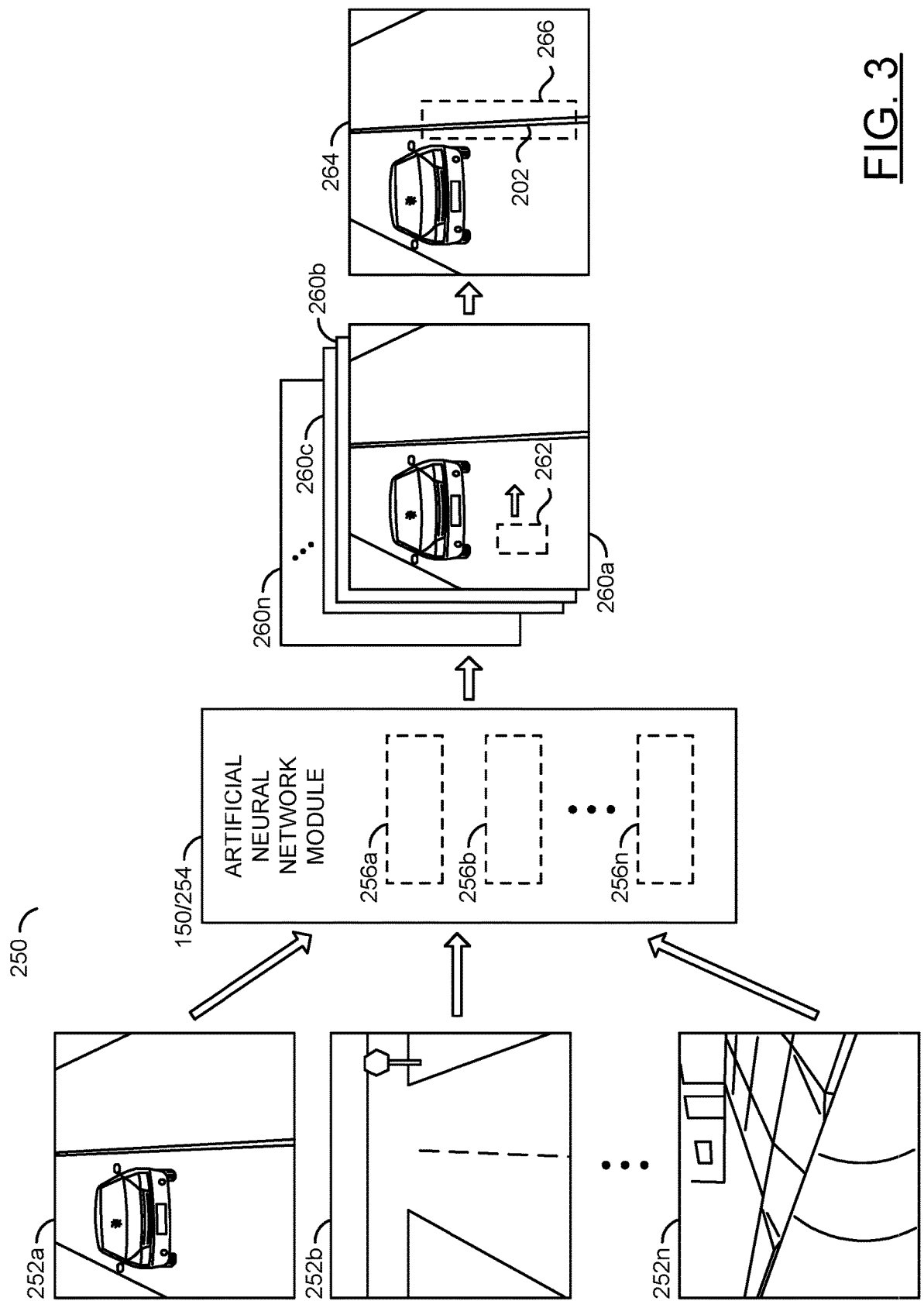
FIG. 3 is a diagram illustrating an example visualization of training a convolutional neural network for object detection using fleet learning.

Referring to FIG. 3, a diagram illustrating an example visualization of training a convolutional neural network for object detection using fleet learning is shown. A training and/or object detection visualization is shown. Images and/or video frames 252a-252n are shown. The images and/or video frames 252a-252n may be training data. The training data 252a-252n may comprise reference images captured from disparate sources. The disparate sources may comprise the video frames FRAMES_A-FRAMES_N processed by the video pipeline module 156 from pixel data and/or video data captured from other sources (e.g., images previously captured by the camera system 100, images received from a database of images (e.g., stock images), images captured by a fleet uploaded to a database of images, etc.). In an example, embodiments of the apparatus 100 may be implemented in a fleet of vehicles (e.g., the ego vehicle 50 and other vehicles may each implement an embodiment of the camera system 100). Each embodiment of the camera system 100 may independently generate video data that may be used as the training data 252a-252n.

To detect objects using computer vision, the convolutional neural network 150 may be trained using the training data 252a-252n. The training data 252a-252n may comprise a large amount of information (e.g., input video frames). For example, multiple vehicles each implementing the camera system 100 may be capable of generating more video data than the camera system 100 installed on the ego vehicle 50 alone. By combining the training data 252a-252n generated from multiple disparate sources (e.g., each implementation of the camera system 100), a greater amount of the training data 252a-252n may be generated and/or a greater variety of the training data 252a-252n may be generated (e.g., video from different types of vehicles, video from different environments, video from different states and/or countries, etc.).

The training data 252a-252n may be labeled. The labels for the training data 252a-252n may be provided as metadata of the video frames. Labeling the training data 252a-252n may enable the CNN module 150 to have a ground truth basis for determining which objects are present in the training data 252a-252n.

A block (or circuit) 254 is shown. The circuit 254 may implement a computing device, a processor and/or a server computer. The circuit 254 may implement a centralized convolutional neural network. The centralized convolutional neural network 254 may comprise blocks (or circuits) 256a-256n. The circuits 256a-256n may implement artificial intelligence models. The centralized convolutional neural network 254 may comprise other components (e.g., a processor, a memory, various dedicated hardware modules, a communication device, etc.). The number, type and/or arrangement of the components of the circuit 254 may be varied according to the design criteria of a particular implementation.

The circuit 254 may be configured to receive the training data 252a-252n. For example, each implementation of the camera system 100 (e.g., installed on multiple different vehicles) may be configured to present the training data 252a-252n to the circuit 254. The labels implemented in the metadata of the training data 252a-252n may comprise information about the video content in the video frame. In an example, if the training data 252a comprises an image of a vehicle, the label may indicate that the video frame comprises a vehicle and/or the particular make/model/year of the vehicle. In another example, if the training data 252i comprises an image of a person, the label may indicate an identity of the person (e.g., for facial recognition), characteristics of the person (e.g., age, gender, height, color of clothing, etc.) and/or behavior of the person (e.g., walking, not moving, reaching, sleeping, etc.). The labels of the training data 252a-252n may provide a ground truth sample. In an example, if the artificial intelligence model 256b is configured to detect a driver (or driver behavior), the training data 252a-252n may provide a ground truth sample of a person performing a particular behavior (e.g., driving). The types of information provided by the labels and/or the format of the labels may be varied according to the design criteria of a particular implementation.

The circuit 254 may be configured to train the artificial intelligence models 256a-256n. The circuit 254 may comprise similar functionality as the CNN module 150. The circuit 254 may have access to greater computing resources (e.g., power, processing capabilities, memory, etc.) than the processors 106a-106n. In an example, the circuit 254 may be implemented as part of a cloud computing service, configured to scale resources based on demand. The additional computing capabilities of the circuit 254 may be capable of handling the large amount of the training data 252a-252n received from the disparate sources.

The AI models 256a-256n may be configured to implement and/or generate a machine readable DAG to detect various objects and/or events. A feature set may be loaded as part of the AI models 256a-256n for analyzing the video frames. The AI models 256a-256n may be continually enhanced in response to the training data 252a-252n. For example, the training data 252a-252n may be used to refine the feature set used to detect objects (e.g., to adjust neural network weight values and/or bias values for the AI models 256a-256n).

The AI models 256a-256n may be generated by the circuit 254 in response to computer vision analysis of the training data 252a-252n. One or more of the AI models 256a-256n may be communicated to the camera system 100. The AI models 256a-256n may be used by the CNN module 150. In an example, the CNN module 150 may implement an AI model, the circuit 254 may receive the training data 252a-252n to refine the AI models 256a-256n, and the CNN module 150 may be updated based on the AI models 256a-256n. Updating the CNN module 150 with one or more of the AI models 256a-256n may enable the CNN module 150 to continually improve the results of the computer vision operations.

The CNN module 150 and the circuit 254 may operate similarly. In some embodiments, the CNN module 150 may receive the training data 252a-252n and update the AI models 256a-256n (e.g., locally). In some embodiments, the circuit 254 may receive the training data 252a-252n and update the AI models 256a-256n for the CNN module 150. For example, the circuit 254 may provide a centralized source for updating the CNN module 150 implemented by multiple implementations of the camera system 100 (e.g., a fleet update). The fleet of vehicles may generate the training data 252a-252n, the circuit 254 may process the training data 252a-252n to update the AI models 256a-256n, and the fleet of vehicles may receive the AI models 256a-256n as an update to the CNN module 150 in order to benefit from the training data 252a-252n generated by the fleet of vehicles. The computer vision operations and/or training performed by the CNN module 150 and the computer vision operations and/or the training performed by the circuit 254 may be implemented similarly. For example, descriptions of operations performed by the circuit 254 may be assumed to apply to the CNN module 150 interchangeably. Similarly, the computer vision operations performed on the training data 252a-252n may be similar to the computer vision operations performed on the video frames FRAMES_A-FRAMES_N generated by the processors 106a-106n.

The artificial intelligence models 256a-256n may be configured to be trained to detect particular objects. Each of the artificial intelligence models 256a-256n may be trained to recognize, classify and/or distinguish one or more types of objects. The number of artificial intelligence models 256a-256n implemented by the CNN module 150 and/or the circuit 254 may be varied according to the design criteria of a particular implementation.

The CNN module 150 may operate in a training mode of operation. In an example, the AI models 256a-256n may be directed acyclic graphs. In the training mode of operation, the AI models 256a-256n may analyze many examples of objects. In one example, if the AI model 256a is configured to detect vehicles, the AI model 256a analyze many examples of vehicle images. Training the AI models 256a-256n may determine and/or calculate parameters, weighting values and/or biases for the directed acyclic graph. The trained AI models 256a-256n may be a DAG with parameters, weighting values and/or biases pre-programmed and/or pre-defined (e.g., based on self-directed learning) for detecting particular types of objects. In some embodiments, the trained AI models 256a-256n may be a quantized neural network (e.g., a reduced size neural network configured to operate on an edge device that has been modified based on a full size neural network that was trained offline (e.g., on the circuit 254).

While the apparatus 100 is in operation, the CNN module 150 may continually learn using new video frames as the input training data 252a-252n. However, the processors 106a-106n may be pre-trained (e.g., configured to perform computer vision before being installed in the vehicle 50). For example, the results of training data 252a-252n (e.g., the machine learning models 256a-256n) may be pre-programmed and/or loaded into the processors 106a-106n. The processors 106a-106n may conduct inferences against the machine learning models 256a-256n (e.g., to perform object detection). In some embodiments, the signal CV generated by the processors 106a-106n may be sent to the interface 104 to enable the communication devices 110 to upload computer vision information (e.g., to the centralized server 254 and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 252a-252n. For example, cameras may be installed in production facilities (e.g., at the end of the production line) to capture many reference images of different types of vehicles to be used as the training data 252a-252n. In the example shown, the training data 252a-252n may capture video data of various vehicle occupants (e.g., captured from one of the capture devices 104a-104n that provides in-cabin monitoring of the ego vehicle 50). For example, the training data 252a-252n may be a sequence of video frames captured prior to the processors 106a-106n determining that a change in orientation of various body parts of an occupant has been detected (e.g., caused by an occupant reaching out, an occupant leaning forward, an occupant moving hands and/or arms, etc.). The training data 252a-252n may be labeled based on whether the prediction was incorrect or correct. Using the training data 252a-252n (e.g., video frames captured from many different vehicles as the vehicles are produced, as different vehicles are deployed on the roads, etc.), many training data sets may be available to train the AI models 256a-256n. In an example, different makes and models of vehicles may be analyzed. In another example, different interior colors may be analyzed. In yet another example, different drivers (e.g., different people) may be analyzed. In still another example, different driving scenes (e.g., flat surfaces, clear weather, dark scenes, etc.) may be analyzed. In some embodiments, the training data 252a-252n may be uploaded to the central CNN module 254 to perform and/or train the AI models 256a-256n for the computer vision. The results (e.g., the AI models 256a-256n) of the training from the central CNN module 254 may be installed on each of the CNN modules 150 of each apparatus 100 (or transmitted while the apparatus 100 is in operation to remotely provide updates via the communication devices 110).

The CNN module 150 and/or the circuit 254 may receive the training data 252a-252n in a training mode of operation. The CNN module 150 may analyze captured video frames (e.g., the signal FRAMES_A-FRAMES_N) to detect object, classify objects and/or extract data about objects using the trained AI models 256a-256n. To perform the training and/or the computer vision operations, the CNN module 150 may generate a number of layers 260a-260n. On each one of the layers 260a-260n, the CNN module 150 may apply a feature detection window 262. In an example, the feature detection window 262 is shown on a portion of the layer 260a. A convolution operation may be applied by the CNN module 150 on each of the layers 260a-260n using the feature detection window 262.

The convolution operation may comprise sliding the feature detection window 262 along the layers 260a-260n while performing calculations (e.g., matrix operations). The feature detection window 262 may apply a filter to pixels that are within the current location of the feature detection window 262 and/or extract features associated with each layer 260a-260n. The groups of pixels within the feature detection window 262 may be changed as the feature detection window 262 slides along the pixels of the layers 260a-260n. The feature detection window 262 may slide along the layers 260a-260n pixel by pixel to capture and/or analyze different groupings of pixels. For example, a first location of the feature detection window 262 may comprise a box of pixels A0 through D0 and A3 through D3 and then the feature detection window 262 may slide horizontally one pixel to comprise a box of pixels B0 through E0 and B3 through E3 (e.g., the pixels from B0 through D0 and B3 through D3 are used in both the first and second operation). The size of the feature detection window 262 and how far (e.g., a stride length) the feature detection window 262 moves for each operation may be varied according to the design criteria of a particular implementation.

The feature detection window 262 may be applied to a pixel and a number of surrounding pixels. In an example, the layers 260a-260n may be represented as a matrix of values representing pixels and/or features of one of the layers 260a-260n and the filter applied by the feature detection window 262 may be represented as a matrix. The convolution operation may apply a matrix multiplication between the region of the current layer covered by the feature detection window 262. The convolution operation may slide the feature detection window 262 along regions of the layers 260a-260n to generate a result representing each region. The size of the region, the type of operations applied by the filters and/or the number of layers 260a-260n may be varied according to the design criteria of a particular implementation.

Using the convolution operations, the CNN module 150 may compute multiple features for pixels of an input image in each extraction step. For example, each of the layers 260a-260n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 262 operates on a pixel and nearby pixels, the results of the operation may have location invariance. The layers 260a-260n may comprise convolution layers, pooling layers, non-linear layers and/or fully connected layers. In an example, the convolution operations may learn to detect edges from raw pixels (e.g., the first layer 260a), then use the feature from the previous layer (e.g., the detected edges) to detect shapes in a next layer (e.g., 260b) and then use the shapes to detect higher-level features (e.g., facial features, vehicles, pedestrians, etc.) in higher layers and the last layer may be a classifier that uses the higher level features.

Using the input video frames as the training data 252a-252n, the CNN module 150 and/or the AI models 256a-256n may be trained. The training may comprise determining weight values for each of the layers 260a-260n. For example, weight values may be determined for each of the layers 260a-260n for feature extraction (e.g., a convolutional layer) and/or for classification (e.g., a fully connected layer). The weight values learned by the CNN module 150 and/or the AI models 256a-256n may be varied according to the design criteria of a particular implementation.

The CNN module 150 may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150 to extract features from the training data 252a-252n may be varied according to the design criteria of a particular implementation.

The CNN module 150 may receive and analyze input images (e.g., the training data 252a-252n in the training mode of operation and/or input video frames when deployed in the ego vehicle 50) that have multiple color channels (e.g., a luminance channel and two chrominance channels). A color detection process implemented by the video pipeline module 156 may be configured to output images with color likelihood (or probability) values for a particular color at one or more pixel locations in the input images. For example, shared buffers between the video pipeline module 156 and/or the CNN module 150 may enable information sharing between components of the processors 106a-106n. The color detection process may be used to extract features from the training data 252a-252n and/or input video frames.

The color detection and/or feature extraction process is generally operational to determine a color likelihood value that pixels in each pixel location of an input image (e.g., the training data 252a-252n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150 may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicate a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 262 may be considered by the color detection process on one of the layers 260a-260n. The feature extraction window 262 may consider a pixel of interest. In an example, the pixel of interest may be a current pixel location being color classified. The feature extraction window 262 may generally represent a local context and contrast around the pixel of interest.

The pixels of the training data 252a-252n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150 may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150 generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150 may generate one or more reference video frames 264. The reference video frame 264 may comprise masks and/or categorized instances of the reference objects 266. The reference objects 266 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases and/or exterior use cases. The computer vision operations performed by the CNN module 150 may determine a size, shape, orientation and/or arrangement of a recognized object.

By analyzing a number of video frames in sequence, the computer vision operations performed by the CNN module 150 may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150.

In some embodiments, the machine learning may be performed by the centralized CNN module 254 that has access to greater computing resources than the camera system 100. Generally, the processing capabilities and/or computing resources available to the centralized CNN module 254 (e.g., implemented as part of a cloud computing network) may be greater than the processing capabilities and/or computing resources available to the CNN module 150 implemented by the processors 106a-106n. For example, the centralized CNN module 254 may perform the machine learning using the training data 252a-252n, develop the machine learning models 256a-256n, and then provide the machine learning model 254 to each apparatus 100 in a fleet of vehicles.

Even after the AI models 256a-256n have been trained and/or the CNN module 150 has been deployed, the processors 106a-106n and/or the centralized CNN module 254 may continue to receive the training data 252a-252n from each apparatus 100, refine the machine learning models 256a-256n, and then provide updates to the machine learning model for each apparatus 100 (received using the communication device 110). The centralized CNN module 254 may develop, refine and/or enhance the machine learning models 256a-256n by receiving input (e.g., the training data 252a-252n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning models 256a-256n adapted to the constraints of the edge device. The processors 106a-106n may be configured to compress the machine learning models 256a-256n (e.g., compressed compared to the machine learning models 256a-256n implemented by the centralized CNN module 254). In an example, compressing the machine learning models 256a-256n may comprise quantization, pruning, sparsification, etc. Compressing the machine learning model may enable the CNN module 150 to perform the machine learning and/or conduct inferences against the machine learning models 256a-256n (e.g., object detection). By performing the machine learning at the edge (e.g., locally on the processors 106a-106n), there may be reduced latency compared to performing wireless communication with the centralized CNN module 254. Similarly, the apparatus 100 may be able to perform the machine learning without maintaining a wireless connection. By performing the machine learning at the edge, privacy may be maintained since the training data 252a-252n would be kept local. Performing the machine learning at the edge (e.g., locally), the processors 106a-106n may preserve privacy and avoid heavy video processing running on back-end servers. Whether the machine learning is performed locally (e.g., at the edge), performed using a centralized resource and/or performed using a combination of local and centralized resources may be varied according to the design criteria of a particular implementation.

The machine learning performed by the CNN module 150 and/or the circuit 254 may comprise supervised training. For example, the CNN module 150 may be self-trained using the training data 252a-252n. Supervised learning may enable the CNN module 150 to automatically adjust the weighting values and/or biases in response to metadata contained within the training data 252a-252n (e.g., a designer and/or engineer may not need to program the weighting values for the AI models 256a-256n). The metadata contained within the training data 252a-252n may provide ground truth data. Backpropagation may be implemented to compute a gradient with respect to the weighting values in response to the training data 252a-252n. For example, the training data 252a-252n may comprise the metadata labels that may enable the CNN module 150 to extract characteristics and apply the extracted characteristics to the weighting values based on the metadata labels.

In one example, where the training data 252a-252n is labeled as providing an image of a vehicle, the CNN module 150 may extract the features from the image and apply the extracted features to the weighting values to make future computer vision operations more likely to determine the presence of a vehicle. Similarly, where the training data 252a-252n is labeled as not providing an image of a vehicle, the CNN module 150 may extract the features from the image and apply the extracted features to the weighting values to make future computer vision operations more likely to determine the presence of a vehicle (e.g., particular weighting values may be decreased to de-emphasize particular features that may not be associated with a vehicle). The CNN module 150 may implement a deep convolutional neural net to enable features to be learned through training.

The labels for the training data 252a-252n may be acquired through various sources. In one example, the training data 252a-252n may be labeled manually (e.g., a person may provide input to indicate which objects are present in a video frame). In another example, the training data 252a-252n may be labeled using sensor fusion. For example, sensor readings may provide the label (e.g., a temperature sensor may indicate a cold environment, an accelerometer and/or a gyroscope may indicate an orientation of the ego vehicle 50, an accelerometer and/or gyroscope may indicate whether an impact has been detected, a proximity sensor may provide a distance value between the ego vehicle 50 and another object, etc.). The sensor fusion module 152 may enable the metadata labels to provide a ground truth value. The source of the labels for the training data 252a-252n may be varied according to the design criteria of a particular implementation.

Figure 4:
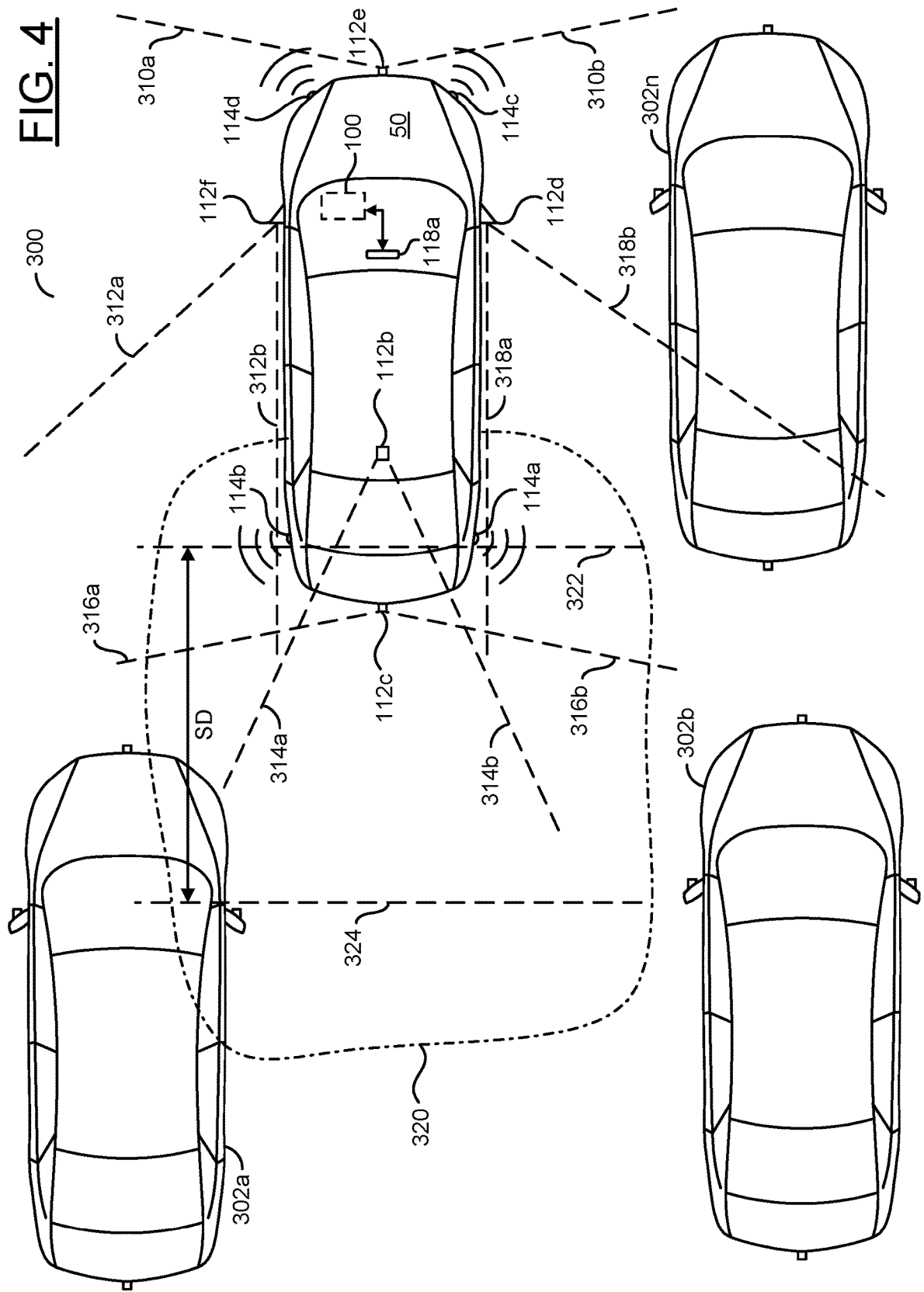
FIG. 4 is a diagram illustrating an overhead view of an ego vehicle in traffic showing a default sensor detection range.

Referring to FIG. 4, a diagram illustrating an overhead view 300 of the ego vehicle 50 in traffic showing a default sensor detection range is shown. The overview view 300 of traffic may comprise other vehicles 302a-302n. The ego vehicle 50 is shown ahead and to the right of the vehicle 302a and ahead and to the left of the vehicle 302b. The ego vehicle 50 is shown to the left of the vehicle 302n.

The apparatus 100 is shown within the ego vehicle 50. The lenses 112a-112f are shown on the ego vehicle 50. The sensors 114a-114d are shown located on the outside of the ego vehicle 50. The display 118a is shown within the ego vehicle 50. While only one of the displays 118a is shown as a representative example, generally the ego vehicle 50 may comprise more than one of the displays 118a-118n.

Each of the lenses 112a-112f may be directed to capture a different field of view. Dotted lines 310a-310b are shown extending from the lens 112e. The dotted lines 310a-310b may represent the field of view exterior to the ego vehicle 50 captured by the capture device 102e. Dotted lines 312a-312b are shown extending from the lens 112f. The dotted lines 312a-312b may represent the field of view exterior to the ego vehicle 50 captured by the capture device 102f. Dotted lines 314a-314b are shown extending from the lens 112b. The dotted lines 314a-314b may represent the field of view exterior to the ego vehicle 50 captured by the capture device 102b. Dotted lines 316a-316b are shown extending from the lens 112c. The dotted lines 316a-316b may represent the field of view exterior to the ego vehicle 50 captured by the capture device 102c. Dotted lines 318a-318b are shown extending from the lens 112d. The dotted lines 318a-318b may represent the field of view exterior to the ego vehicle 50 captured by the capture device 102d. Pixel data generated corresponding to each of the fields of view captured by the lenses 112a-112f may be presented to the processors 106a-106n.

The lens 112e may be located on a front bumper of the ego vehicle 50. The field of view 310a-310b captured by the lens 112e may extend from a front end of the ego vehicle 50. The lens 112f may be located on a driver side of the ego vehicle 50 (e.g., located on a driver side mirror). The field of view 312a-312b captured by the lens 112f may extend from a driver side of the ego vehicle 50 and capture a view behind and beside the ego vehicle 50. The lens 112b may be located on a roof of the ego vehicle 50 and the lens 112c may be located on a rear bumper of the ego vehicle 50. The field of view 314a-314b captured by the lens 112b and the field of view 316a-316b captured by the lens 112c may extend from a rear end of the ego vehicle 50 to capture the region behind the ego vehicle 50. In some embodiments, only one of the lens 112c or the lens 112b may be implemented. The lens 112d may be located on a passenger side of the ego vehicle 50 (e.g., located on a passenger side mirror). The field of view 312a-318b captured by the lens 112d may extend from a passenger side of the ego vehicle 50 and capture a view behind and beside the ego vehicle 50. Together, the pixel data captured by the lenses 112a-112f may enable a surround view around the ego vehicle 50 to be captured.

The sensors 114a-114d may be configured to implement proximity detectors. The sensors 114a-114d may be configured to detect a distance between the ego vehicle 50 and an obstacle (e.g., one or more of the vehicles 302a-302n, trees, pedestrians, animals, curbs, bushes, street signs, buildings, etc.). In an example, the sensors 114a-114d may be configured to determine when an obstacle is within a particular distance from the sensors 114a-114d. The sensors 114a-114d are shown located on various locations around the ego vehicle 50 to provide a distance measurements to various obstacles from various portions of the ego vehicle 50. The sensors 114a-114d may be configured to operate independently from each other and/or the capture devices 102a-102n. In one example, one or more of the sensors 114a-114d may implement radar sensors. In another example, one or more of the sensors 114a-114d may implement ultrasonic sensors. In yet another example, one or more of the sensors 114a-114d may implement lidar sensors. The number, type and/or arrangement of the sensors 114a-114d on the ego vehicle 50 may be varied according to the design criteria of a particular implementation.

The sensors 114a-114d may generate a notification (e.g., an alert) to the processors 106a-106n, a CAN bus of the ego vehicle 50 and/or another module of the ego vehicle 50 when an obstacle is determined to be within a pre-determined distance from the ego vehicle 50. In some embodiments, the sensors 114a-114d may provide a measurement value to the interface 104. For example, the interface 104 may receive the signal SEN in response to a detection of an obstacle by the sensors 114a-114d. The processors 106a-106n may analyze the information in the signal SEN to determine if the obstacle is within the pre-determined distance to the ego vehicle 50. If the obstacle is within the pre-determined distance to the ego vehicle 50, then the processors 106a-106n may generate the signal VCTRL (e.g., the sensors 114a-114d may communicate a distance measurement to an obstacle and the processors 106a-106n may compare the distance measurement to the pre-defined distance). The signal VCTRL may be presented to the actuators 116 to provide a notification to the driver (e.g., an audible alert). In another example, one or more of the signals VOUT_A-VOUT_N may be presented to the displays 118a-118n in order to provide a visual warning about the detected obstacle.

In some embodiments, the processors 106a-106n may provide the signal SEN to the sensors 114a-114d to set the pre-determined distance for detecting an obstacle. Then the sensors 114a-114d may detect an obstacle within the pre-determined distance and send the signal SEN to the interface 104 and the interface 104 may enable a notification to be generated (e.g., using the actuators 116, using the displays 118a-118n, the communication devices 110, etc.). For example, the pre-determined distance may be stored on the sensors 114a-114d and the sensors 114a-114d may compare the distance measured to the detected obstacle with the pre-determined distance.

A dotted line 320 is shown. The dotted line 320 may define a region towards the rear of the ego vehicle 50. The region 320 may be a sensor range. The region 320 may represent a maximum sensor range for the sensors 114a-114b (e.g., the two of the sensors 114a-114d located on a rear end of the ego vehicle 50). For example, the sensors 114a-114b may be capable of detecting obstacles as far as the edge of the sensor range 320. The sensors 114a-114d may be calibrated to detect objects only within a range that is less than the maximum range of the sensor range 320. The maximum sensor range 320 for the sensors 114a-114d may depend on the technology and/or materials used to implement the sensors 114a-114d.

A dashed line 322 and a dashed line 324 are shown. The dashed line 322 may extend through the sensors 114a-114b. The dashed line 322 may represent a reference location for the sensors 114a-114b on the ego vehicle 50. The dashed line 324 may extend through the region 320. The dashed line 324 may represent a detection distance for the sensors 114a-114b. A distance SD is shown between the reference location 322 and the detection distance 324. The sensors 114a-114b may be configured to generate a notification in response to one of the obstacles being detected within the region 320 within the detection distance SD from the sensors 114a-

114*b*. The sensors 114*a*-114*d* may each be configured to operate using a default detection distance. The distance SD may be the default detection distance.

In the example shown, the vehicle 302*a* may be within the region 320 and closer to the ego vehicle than the default detection distance SD. The sensors 114*a*-114*b* and/or the processors 106*a*-106*n* may detect the vehicle 302*a* as an obstacle within the pre-determined detection distance from the ego vehicle 50. The sensors 114*a*-114*b* may provide a notification to the processors 106*a*-106*n* (or a vehicle CAN bus). An alert may be presented to the driver 202 of the ego vehicle 50 in response to the detection of the obstacle within the distance SD from the ego vehicle 50.

The detection distance may be configured to be calibrated by the processors 106*a*-106*n*. The processors 106*a*-106*n* may be configured to change the detection distance used by the processors 106*a*-106*n*. In one example, the processors 106*a*-106*n* may increase the detection distance farther away from the ego vehicle 50 than the default detection distance SD (e.g., as far as the maximum distance of the detection region 320). In another example, the processors 106*a*-106*n* may decrease the detection distance closer to the ego vehicle 50 than the default detection distance SD. The detection distance selected by the processors 106*a*-106*n* for each of the sensors 114*a*-114*d* may be varied according to the design criteria of a particular implementation.

The sensor fusion module 152 may be configured to combine the detection of the vehicles 302*a*-302*n* from the video data captured using the lenses 112*a*-112*f* with a detection of objects using the proximity sensors 114*a*-114*d*. The sensor fusion module 152 may be further configured to weight the information received from the computer vision operations. For example, in clear conditions, the sensor fusion module 152 may provide a greater amount of weight on the results generated in response to the computer vision operations than the data provided by the sensors 114*a*-114*d*. In another example, when the environment is foggy or rainy, the sensor fusion module 152 may decrease an amount of weight for the results generated in response to the computer vision operations and increase an amount of weight applied to the results generated by the sensors 114*a*-114*d* (e.g., visibility in the video data may be decreased in poor conditions).

Based on the detections by the processors 106*a*-106*n* corresponding with the field of view of the lenses 112*a*-112*f* and the detections performed by the sensors 114*a*-114*d*, the processors 106*a*-106*n* may be configured to infer a presence of obstacles and/or distances to obstacles from the ego vehicle 50. For example, the sensor fusion module 152 may be configured to weight the information provided by each sensor (e.g., a confidence level of the computer vision detection, a confidence level of the detection of the sensor 114*a*, the distance limitations of the sensor 114*a*, whether the computer vision detects the vehicle 302*b* at a distance beyond the range of the sensor 114*a*, etc.). Based on the detections by the processors 106*a*-106*n* corresponding with the field of view of the lenses 112*a*-112*f*, the processors 106*a*-106*n* may be configured to infer the surroundings of the ego vehicle 50.

The processors 106*a*-106*n* may be configured to detect events. The event may be information that warrants being brought to the attention of the driver 202. For example, whether a detected scenario is considered an event may be determined by the decision module 158. In one example, the event may correspond to detecting that one of the vehicles 302*a*-302*n* may be on a collision course with the ego vehicle 50. The events may be detected based on the computer vision operations performed on the video data captured using the lenses 112*a*-112*f*. The events may be detected based on readings from the sensors 114*a*-114*d*. For example, the sensor fusion module 152 may be configured to combine information determined using the computer vision operations and information detected using the sensors 114*a*-114*n* to make inferences that may be used by the decision module 158.

In one example, the mere presence of the vehicles 302*a*-302*n* may not be enough to be considered an event. However, when one or more of the vehicles 302*a*-302*n* are too close to the ego vehicle 50 and/or are on a collision course with the ego vehicle 50 (e.g., a crash is imminent without corrective actions), then one or more of the vehicles 302*a*-302*n* may be considered an event. In the example shown, the vehicle 302*b* and the vehicle 302*n* may be considered to be far away and unlikely to collide with the ego vehicle 50 (e.g., non-events). In the example shown, the vehicle 302*a* may be close and/or approaching the ego vehicle 50 and may be a concern to the driver (e.g., the vehicle 302*a* may be considered an event because the vehicle 302*a* may be approaching the ego vehicle 50 or because if the driver 202 changes lanes the ego vehicle 50 may collide with the vehicle 302*a*). In some embodiments, the mere presence of a detected object may be considered an event. In one example, if an emergency vehicle is detected (e.g., ambulance, police car, etc.), the decision module 158 may determine that there is an event. In another example, if there is a pothole, a spill, an accident, a school bus, a towing vehicle on the shoulder, etc. the decision module 158 may determine that there is an event. In yet another example, local laws and/or regulations may define what should be considered an event. The type of detection(s) that the decision module 158 may consider an event may be varied according to the design criteria of a particular implementation.

The processors 106*a*-106*n* may be configured to generate a notification in response to the detected event. The notification may be displayed on one or more of the displays 118*a*-118*n*. For example, when the decision module 158 determines that an event has been detected, the processors 106*a*-106*n* may generate the notification as part of (or alongside) one or more of the signals VOUT_A-VOUT_N. In one example, the notification may be overlaid on top of the video data displayed on the displays 118*a*-118*n*. In some embodiments, the notification may be an audio notification (e.g., a beeping sound, a voice message describing the location of the detected obstacle, etc.). In some embodiments, the notification may be a haptic notification (e.g., the steering wheel may vibrate). The types of notifications generated may be varied according to the design criteria of a particular implementation.

Figure 5:
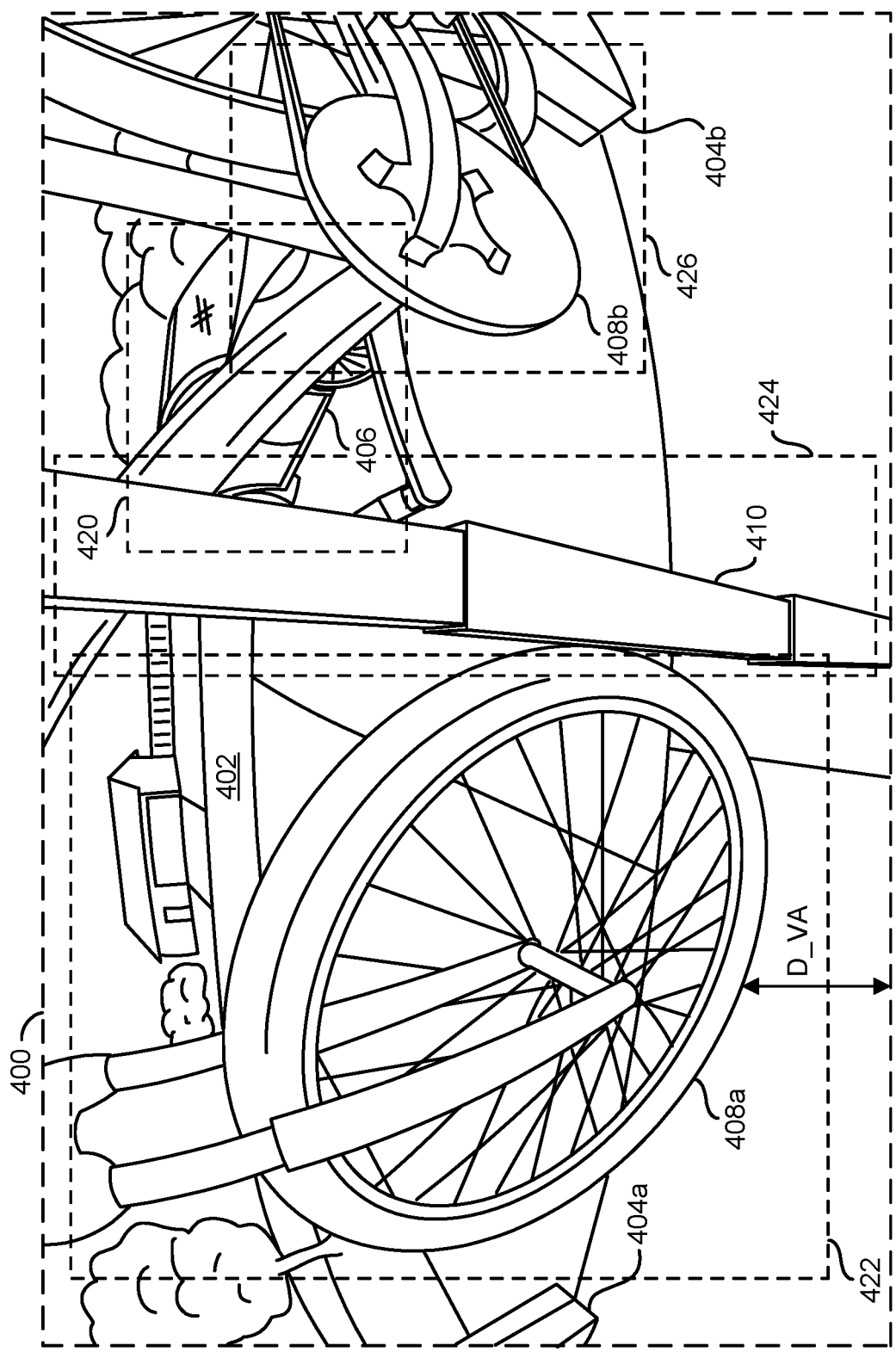
FIG. 5 is a diagram illustrating an example video frame of a vehicle attachment captured by a rear-mounted camera.

Referring to FIG. 5, a diagram illustrating an example video frame of a vehicle attachment captured by a rear-mounted camera is shown. An example video frame 400 is shown. In one example, the example video frame 400 may be a portion (e.g., a subset) of a full video frame captured by one of the capture devices 102*a*-102*n*. In another example, the video frame 400 may be a portion of the 360 degree field of view captured by the lenses 112*b*-112*f* shown in association with FIG. 4. In the example shown, the video frame 400 may comprise an example of the field of view 316*a*-316*b* captured by the lens 112*c* of the rear bumper-mounted capture device 102*c*.

The processors 106*a*-106*n* may be configured to generate video data from the video frames FRAMES_A-FRAMES_N that have a sufficiently high resolution that portions of the video frame may have enough detail for computer vision operations to be performed. In an example, digital zooming, dewarping, over sampling and/or cropping may be performed on a full video frame to generate a video frame portion. In another example, the computer vision operations may be performed on a targeted subset of the full video frame. For example, if the full video frame is a 4K resolution video frame, the video frame portion may have sufficient detail for the CNN module 150 to detect objects. The method of generating the video frame 400 (or a portion of the video frame) may be varied according to the design criteria of a particular implementation.

The example video frame 400 may provide an image of the environment near the rear end of the ego vehicle 50. The example video frame 400 may comprise a view towards behind the ego vehicle 50. For example, the example video frame 400 may comprise a video frame generated from pixel data captured by the capture device 102c (e.g., a rear bumper-mounted camera). While other views of the environment may provide information that may be used by the processors 106a-106n to determine attachments on the ego vehicle 50, generally data analyzed from the rear view may be the most relevant (e.g., since most people mount vehicle attachments such as bike racks on a rear end of a vehicle). For example, a public transport bus may provide a bike rack on a front end of the bus and the video frames generated from the front bumper mounted capture device 102e may be the most relevant. The example video frame 400 may comprise a view from the perspective of the rear of the ego vehicle 50 (e.g., the ego vehicle 50 may not be visible for the capture device 102c mounted on a rear end of the ego vehicle 50 or only a portion of the bumper may be visible). The processors 106a-106n may be designed with the dedicated hardware modules 180a-180n configured to efficiently generate high resolution video frames in real-time and perform the computer vision operations in real-time.

The example video frame 400 may comprise a view of a road 402. The road 402 may be a residential road. For example, the view of the road 402 in the example video frame 400 may be a view from down a driveway. In the example shown, the ego vehicle 50 may be driving in reverse down a driveway towards the road 402. Garage door edges 404a-404b are shown on either side of the example video frame 400. For example, the driver 202 may be driving in reverse out of a garage and down onto the road 402. In one example, the garage door edges 404a-404b may be obstacles that may be detected by the computer vision operations and/or the proximity sensors 114a-114d. For example, a notification that the ego vehicle 50 is too close to one of the garage door edges 404a-404b may be helpful to the driver 202 when maneuvering out of the garage in reverse.

A vehicle 406 is shown behind the ego vehicle 50. The vehicle 406 may be another car that may be parked on the driveway. The vehicle 406 may be an obstacle that may be detected by the computer vision operations and/or the proximity sensors 114a-114d. For example, a notification that the ego vehicle 50 is too close to the parked vehicle 406 may be helpful to the driver 202 when maneuvering down the driveway in reverse.

Bicycle portions 408a-408b and a rack mount 410 are shown. The bicycle portion 408a may be a front wheel of a bicycle. The bicycle portion 408b may be a crank of the bicycle. The bicycle may be attached to the ego vehicle 50 using the rack mount 410. For example, the bicycle portions 408a-408b and the rack mount 410 may be connected to the ego vehicle 50 and may remain in the field of view of the example video frame 400 as the ego vehicle 50 moves.

The example video frame 400 may comprise video data of a view of less than all of the bicycle. For example, some of the bicycle (e.g., the handlebars) may not be visible in the perspective captured by the capture device 102c. The bicycle portions 408a-408b may not be an obstacle for the ego vehicle 50. For example, a notification and/or warning about the bicycle and/or the rack mount 410, may be a source of annoyance and/or distraction to the driver 202 (e.g., the bicycle portions 408a-408b and/or the rack mount 410 may continually remain in the video frames since the objects are attached to the ego vehicle 50).

The bicycle portions 408a-408b and/or the rack mount 410 may be vehicle attachments. In one example, the vehicle attachments may be permanently attached to the ego vehicle 50 (e.g., a tow hitch). In another example, the vehicle attachments may be temporarily attached to the ego vehicle 50 (e.g., but attached throughout an entire driving session). The objects that are determined by the processors 106a-106n to be vehicle attachments may be detected by the processors 106a-106n in order to re-calibrate the detection ranges for the sensors 114a-114d.

Dotted boxes 420-426 are shown. The dotted boxes 420-426 may represent the computer vision operations performed by the processors 106a-106n. The dotted boxes 420-426 may be objects detected that may be obstacles (e.g., objects the ego vehicle 50 may collide with) and/or vehicle attachments for the ego vehicle 50 (e.g., objects attached to the ego vehicle 50 that the ego vehicle 50 may not collide with). The CNN module 150 may be configured to detect features and/or descriptors in the example video frame 400 and compare the features and/or descriptors against the features and/or descriptors learned from the training data 252a-252n in order to recognize the pixels of the video frame 400 that correspond to various objects. While only the objects 420-426 are shown detected in the example video frame 400, the processors 106a-106n may be configured to detect other objects in the video frame that may or may not be relevant to determining obstacles and/or vehicle attachments for the ego vehicle 50 (e.g., the road, license plates, buildings, people, animals, bicycles, scooters, etc.). For examples, the objects 420-426 may correspond to the driving conditions used to determine whether or not to re-calibrate the sensor range of the sensors 114a-114d. The types of objects detected may be varied according to the design criteria of a particular implementation.

The dotted boxes 420-426 may comprise the pixel data corresponding to an object detected by the computer vision operations pipeline 162 and/or the CNN module 150. The dotted boxes 420-426 are shown for illustrative purposes. In an example, the dotted boxes 420-426 may be a visual representation of the object detection (e.g., the dotted boxes 420-426 may not appear on an output video frame displayed on one of the displays 118a-118n). In another example, the dotted boxes 420-426 may be a bounding box generated by the processors 106a-106n displayed on the video frame to indicate that an object has been detected (e.g., the bounding boxes 420-426 may be displayed in a debug mode of operation). The number and/or types of objects detected by the processors 106a-106n may be varied according to the design criteria of a particular implementation.

In some embodiments, the bounding boxes 420-426 may correspond to the region of the example video frame 400 that potentially be a vehicle attachment. For example, only objects within a particular distance from the ego vehicle 50 may be a vehicle attachment. The objects 420-426 may be detected as a sub-portion of the example video frame 400 that comprises a region near the rear bumper of the ego vehicle 50 (e.g., the processors 106a-106n may limit the search region for detecting the objects 420-426 that may affect the re-calibration of the sensors 114a-114d to the region of the video frame 400 that corresponds to the distance close to the ego vehicle 50). For example, the processors 106a-106n may intelligently analyze the video frame 400 to limit the amount of processing power and/or processing time used to search for the objects 420-426 that may affect the re-calibration of the sensors 114a-114d of the ego vehicle 50.

Intelligently analyzing a sub-portion of the video frame 400 may be more efficient than analyzing the entire video frame 400. For example, a lower granularity analysis (e.g., using less processing resources) of the video frame 400 may be performed to detect the general area near the ego vehicle 50 and then a higher granularity analysis (e.g., using more processing resources) of the sub-region of the video frame 400 with the region near the ego vehicle 50 may be performed to detect the objects 420-426 that may affect the re-calibration of the sensors 114a-114d of the ego vehicle 50. For example, the processors 106a-106n may intelligently make an assumption that objects that are on the road 402 may be unlikely to affect the re-calibration of the sensors 114a-114d. The type of analysis and the processing resources used for particular regions of the example video frame 400 may be varied according to the design criteria of a particular implementation.

The object 420 may represent a detection of the parked vehicle 406. The CNN module 150 may analyze the characteristics of the object 420. For example, an analysis of the object 420 may indicate that the object 420 may not be moving together with the ego vehicle 50. In another example, an analysis of the object 420 may indicate that the object 420 may be relatively close to the rear end of the ego vehicle 50. For example, the vehicle 406 may be close enough to the ego vehicle 50 to be an object towed by the ego vehicle 50 (e.g., a camper, or towing another vehicle). In yet another example, an analysis of the object 420 may indicate that the object 420 may be offset to one side of the example video frame 400. The decision module 158 may weigh multiple factors based on the characteristics detected about the object 420. For example, since the object 420 may not be moving with the ego vehicle 50 and offset from the ego vehicle 50, the decision module 158 may determine that the object 420 is not a vehicle attachment. For example, the decision module 158 may classify the vehicle 406 as a parked vehicle that may be an obstacle.

The object 422 may represent a detection of the bicycle portion 408a. The CNN module 150 may analyze the characteristics of the object 422. For example, an analysis of the object 422 may classify the object 422 as a bicycle wheel. In another example, the analysis of the object 422 may detect that the object 422 is a close distance (e.g., the distance D_VA) from the ego vehicle 50. In yet another example, the analysis of the object 422 may detect that the object 422 moves along with the ego vehicle 50 (e.g., remains generally at a static location in the video frame 400, even while the ego vehicle 50 moves and the other regions of the video frame 400 change). The decision module 158 may weigh multiple factors based on the characteristics detected about the object 422. For example, since the object 422 may be moving with the ego vehicle 50 and may be a type of object that may be commonly attached to a vehicle, the decision module 158 may determine that the object 422 is a vehicle attachment. For example, the decision module 158 may classify the bicycle portion 408a as a bicycle that may be a vehicle attachment.

The object 424 may represent a detection of the rack mount 410. The CNN module 150 may analyze the characteristics of the object 424. For example, an analysis of the object 424 may classify the object 424 as a rack mount. In another example, the analysis of the object 424 may detect that the object 424 is centered with respect to the ego vehicle 50. In yet another example, the analysis of the object 424 may detect that the object 424 moves along with the ego vehicle 50. The decision module 158 may weigh multiple factors based on the characteristics detected about the object 424. For example, since the object 424 may be centered and moving with the ego vehicle 50 and may be a type of object that may be commonly attached to a vehicle, the decision module 158 may determine that the object 424 is a vehicle attachment. For example, the decision module 158 may classify the rack mount 410 as an object that may be a vehicle attachment.

The object 426 may represent a detection of the bicycle portion 408b. The CNN module 150 may analyze the characteristics of the object 426. The analysis of the object 426 for the bicycle portion 408b may be similar to the analysis of the object 422 for the bicycle portion 408a. In an example, an analysis of the object 426 may classify the object 426 as a bicycle crank. In another example, the analysis of the object 426 may determine that the object 426 is a portion of the same bicycle as the object 422. The decision module 158 may weigh multiple factors based on the characteristics detected about the object 426. For example, since the object 426 may be part of a larger object with the object 422, the decision module 158 may determine that the object 426 is a vehicle attachment along with the object 422. For example, the decision module 158 may classify the bicycle portion 408b as a bicycle that may be a vehicle attachment.

The processors 106a-106n may determine a distance to the objects determined to be vehicle attachments. In the example shown, the distance D_VA is shown as a distance from the lens 112c to the object 422. Since the lens 112c is attached to the rear bumper of the ego vehicle 50, the lens 112c may be used as a proxy for one end of the ego vehicle 50. The distance D_VA may represent an amount of distance that the vehicle attachment(s) extend a length of the ego vehicle 50. For example, the ego vehicle 50 may have a size (e.g., based on the make/model/year of the vehicle) and the vehicle attachments detected may, in effect, extend the size of the ego vehicle 50. For example, if the ego vehicle has a length of DV, then the length of the ego vehicle 50 with the vehicle attachments may be DV+DV_A.

The processors 106a-106n may be configured to re-calibrate the sensors 114a-114d in order to account for the size of the ego vehicle 50 with the vehicle attachment(s). In an example, if the sensors 114a-114d detect the vehicle attachments as objects, the sensors 114a-114d may provide unhelpful notifications (e.g., since the ego vehicle 50 would not crash into the attached objects). For example, the processors 106a-106n may suppress (e.g., prevent) proximity notifications from the sensors 114a-114d about the vehicle attachments. In another example, if the sensors 114a-114d detect the obstacle 406 based on the default detection distance from the ego vehicle 50, the notification generated may not provide an accurate warning since the ego vehicle 50 may be a larger size with the vehicle attachments (e.g., the warning may be generated when the ego vehicle 50 is already too close to the obstacle 406). The processors 106a-106n may re-calibrate the sensors 114a-114d in order to enable the sensors 114a-114d to provide the same type of performance as when there is no vehicle attachment(s), by taking into account the updated size of the ego vehicle 50 when there are vehicle attachment(s). For example, if a notification is generated when an obstacle is within 5 feet of the ego vehicle 50, then when the vehicle attachment adds one foot to the effective size of the ego vehicle 50, the notification may be generated when the obstacle is within 6 feet of the ego vehicle 50 (or within 5 feet of the vehicle attachment).

The decision module 158 may weigh multiple factors to make a determination about the obstacles and/or vehicle attachments. The determination may be provided as a confidence level. The confidence level may provide a numerical and/or computer readable representation of how likely the result of the determination is correct. For example, if the decision module 158 determines that the detected object is attached to the ego vehicle 50 that is greater than a threshold level, then the processors 106a-106n may re-calibrate the sensors 114a-114d. The threshold level may be a pre-defined and/or programmable value.

The processors 106a-106n may analyze each of the objects 420-426 individually and in relation with each other. For example, the object 422 being a portion of a bicycle and the object 426 also being a portion of the bicycle may increase a confidence level that there is a bicycle attached to the ego vehicle 50. In another example, detecting that the rack mount 410 is moving along with the ego vehicle 50 while the vehicle 406 is not moving with respect to the ego vehicle 50 may decrease a confidence level that the vehicle 406 is a vehicle attachment. Each factor may have a different amount of weighting applied to the final confidence level score. The various weights and/or biases applied to each factor for each of the objects 420-426 may be varied according to the design criteria of a particular implementation.

The processors 106a-106n may analyze multiple video frames in a sequence of captured video frames to enable an analysis of the objects 420-426 over time. For example, the object 422 may be determined to move along with the ego vehicle 50 by analyzing a location of the object 422 over a sequence of the video frames. However, by analyzing a location of the object 420 over a sequence of video frames, the processors 106a-106n may detect the object 420 is not moving along with the ego vehicle 50.

Metadata may be applied to each video frame captured. The metadata may comprise information about the objects detected, the features extracted, the movement determined, which objects are determined to be vehicle attachments and/or the distances selected for the sensor range re-calibration. In an example, metadata applied to the example video frame 400 may comprise information detected using the computer vision operations (e.g., the object 420 is not attached to the ego vehicle 50, the object 422 and the object 426 being part of the same object, the distance D_VA selected for the re-calibration distance, the object 424 being a rack mount, etc.). The decision module 158 may use the metadata applied to multiple video frames to predict the future objects and/or sensor re-calibrations configuration. In an example, in a first video frame, the metadata may provide one set of information (e.g., the vehicle attachment classification for the objects 422-426, the object 420 behind the ego vehicle 50), and a next video frame may comprise metadata that provides another set of information (e.g., the vehicle attachment classification for the objects 422-426, the object 420 no longer being in the rear video frames because the ego vehicle 50 has passed by the vehicle 406) and the decision module 158 may analyze the metadata from the multiple video frames to make a determination.

In the example shown, the entirety of the bicycle may not be visible. For example, without a full view of the bicycle, the processors 106a-106n may not be able to determine an exact value for the distance D_VA (e.g., the handlebars of the bicycle may stick out farther than the wheel). In some embodiments, video data from another of the capture devices 102a-102n may be used in combination with the data in the example video frame 400. For example, the video data generated by the capture device 102b (a view from the roof-mounted lens 112b) may provide a view of the bicycle attached to the rear of the ego vehicle 50 that captures the handlebars (or other portions of the bicycle not visible in the example video frame 400). For example, the processors 106a-106n may be configured to determine the distance D_VA from the lens 112c using the example video frame 400 and determine another distance (e.g., a distance to the handlebars of the bicycle) based on a distance from the lens 112b. The processors 106a-106n may compensate for the difference between the distances of the lens 112b-112c to determine whether the handlebars stick out farther from the rear end of the ego vehicle 50 than the distance D_VA. The processors 106a-106n may use the longest distance as the re-calibration value for the sensors 114a-114d after compensating (e.g., normalizing) for the difference of the distance of the lens 112b from the rear end of the ego vehicle 50.

In some embodiments, the processors 106a-106n may be configured to perform an estimation of the distances, based on pre-defined information about various objects. In an example, the distance D_VA may be determined based on a distance to a wheel of a bicycle. Based on pre-defined information about bicycles, the processors 106a-106n may infer a distance that the handlebars extend from the detected wheel (e.g., handlebars may extend two feet from each wheel). The inferred distance may be used as the distance for the re-calibration of the sensors 114a-114d. For example, based on a type of the object detected when only a portion of the object is visible in the video frames, the processors 106a-106n may be configured to infer characteristics of the whole object.

In some embodiments, the processors 106a-106n may determine the distance D_VA in response to the objects (or portions of objects) classified as the vehicle attachments. In order to account for a possibility that portions of the detected vehicle attachments may not be visible in the example video frame 400, the processors 106a-106n may add a buffer distance to the distance D_VA. The buffer distance may be a pre-defined extra distance that may be added to the detected distance D_VA. The extra distance may be a small amount (e.g., a foot or two). The buffer distance may provide extra room in case portions of the vehicle attachment extend beyond the ego vehicle 50 more than the detected distance D_VA.

The objects detected may be classified as vehicle attachments in response to an analysis of the characteristics of the detected objects. The characteristics may be used to provide evidence that, when taken together, may provide a sufficient amount of confidence to enable the decision module 158 to determine that the detected object is a vehicle attachment. In one example, the characteristics that provide evidence of a vehicle attachment may be generally central location of the detected objects with respect to the lens 112c (e.g., the vehicle attachment may be mounted across the rear end of the ego vehicle 50). In another example, the characteristics may be used to determine a type of the object and particular types of objects may provide evidence that the detected object is a vehicle attachment (e.g., bikes and rack mounts may be a class of object that is commonly attached to a rear end of the ego vehicle 50). The types of objects considered to be commonly used as vehicle attachment may be determined before the video frames are generated (e.g., based on customer survey data, based on training data captured from a fleet of vehicles, etc.). In yet another example, one of the characteristics that may provide evidence of the detected object being a vehicle attachment may be a permanence of the object in the video frames. For example, since the vehicle attachments may be secured to the ego vehicle 50, the vehicle attachments may generally not move with respect to the ego vehicle 50. Some objects may move slightly (e.g., a flag attached may blow in the wind, but generally remain in a small range of positions). The types of factors that may indicate that an object is a vehicle attachment may be varied according to the design criteria of a particular implementation.

Figure 6:
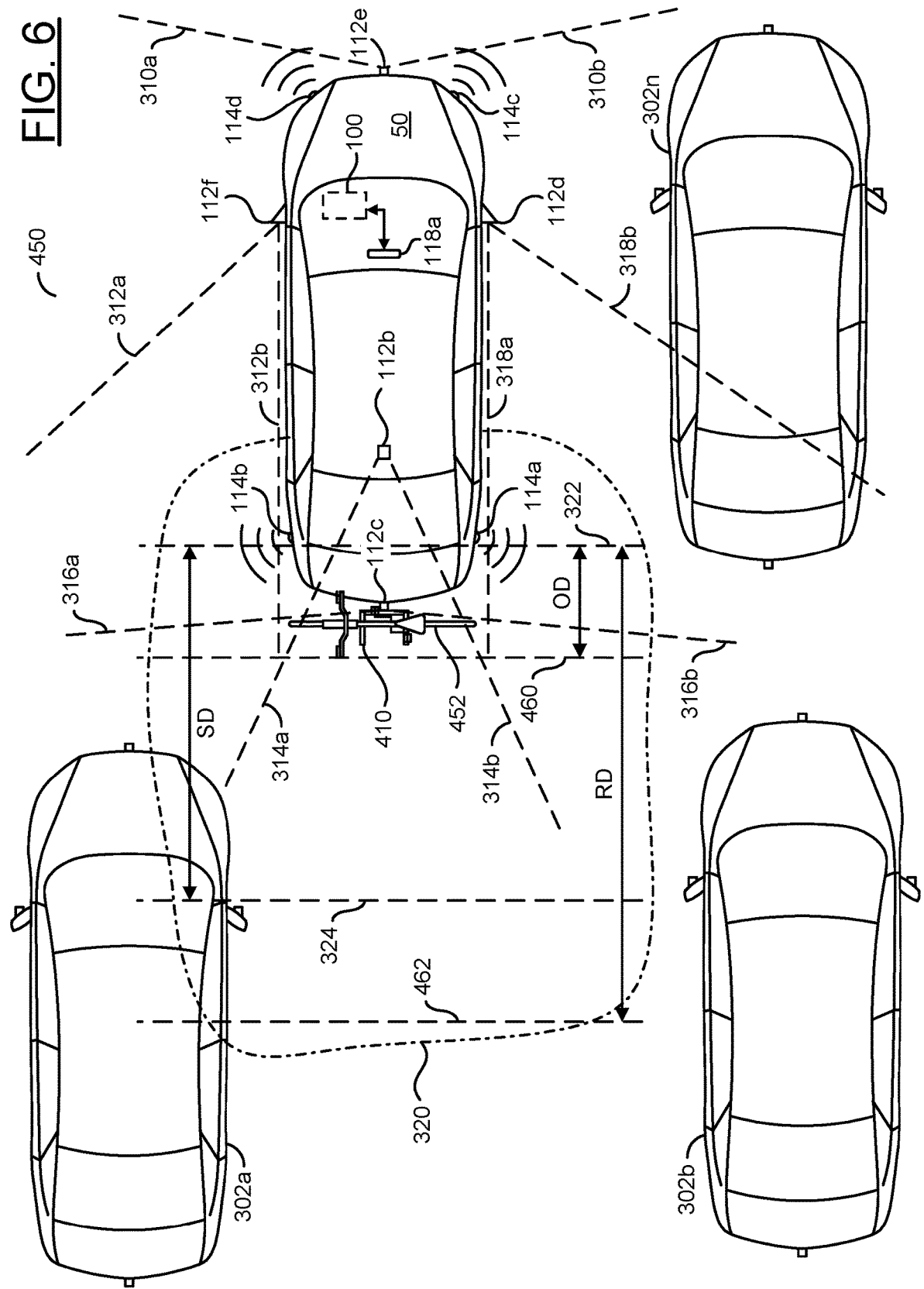
FIG. 6 is a diagram illustrating an overhead view of an ego vehicle in traffic showing a recalibrated sensor detection range in response to a vehicle attachment.

Referring to FIG. 6, a diagram illustrating an overhead view 450 of an ego vehicle 50 in traffic showing a recalibrated sensor detection range in response to a vehicle attachment is shown. The overhead view 450 may be similar to the overhead view 300 shown in association with FIG. 4. The ego vehicle 50 is shown in traffic near the vehicles 302a-302n. The apparatus 100 is shown implemented in the ego vehicle 50 along with the camera lenses 112a-112f, the sensors 114a-114d and the display 118a. The field of views of view 310a-310b, 312a-312b, 314a-314b, 316a-316b and 318a-318b are shown. The maximum detection region 320 for the sensors 114a-114b are shown with the sensor reference line 322 and the default detection distance line 324.

In the overhead view 450, the rack mount 410 (as shown in the video frame 400 in association with FIG. 5) and a bicycle 452 (e.g., comprising the portions 408a-408b as shown in association with FIG. 5) are shown attached to a rear end of the ego vehicle 50. The rack mount 410 and the bicycle 452 may be vehicle attachments that have been secured to the ego vehicle 50. The rack mount 410 and the bicycle 452 may be mounted in front of the lens 112c of the capture device 102c. For example, the lens 112c may capture the field of view shown in the example video frame 400 shown in association with FIG. 5.

The computer vision operations performed by the processors 106a-106n may detect and classify the rack mount 410 and the bicycle 452 as the vehicle attachments. The computer vision operations performed by the processors 106a-106n may further determine the distance D_VA as the distance of the vehicle attachments from the end of the ego vehicle 50. In the example shown, since the handlebars of the bicycle 452 is the portion of the vehicle attachments that extend farthest away from the rear bumper of the ego vehicle 50, the distance D_VA may be a measurement of the distance from the rear end of the ego vehicle 50 (e.g., based on the location of the lens 112c) and the end of the handlebars of the bicycle 452. The distance D_VA may be used by the processors 106a-106n to re-calibrate the sensors 114a-114b.

A dashed line 460 is shown. The dashed line 460 may be a reference location that corresponds to the amount of distance that the detected vehicle attachment(s) extend beyond the ego vehicle 50. In the example shown, the vehicle attachment reference location 460 may be even with the handlebars of the bicycle 452. The vehicle attachment reference location 460 may be at the distance D_VA from the rear end of the ego vehicle 50.

A distance (e.g., OD) is shown. The distance OD may be an object distance between the vehicle attachment(s) (e.g., at the vehicle attachment reference location 460) and the location of the sensors 114a-114b (e.g., at the sensor reference location 322). In some embodiments, the sensors 114a-114b may be located on the rear bumper along with the lens 112c and the distance OD may be the same distance as the distance D_VA from the lens 112c. In some embodiments, the sensors 114a-114b may not be located on the rear bumper and the distance OD may be the distance D_VA plus a distance from the lens 112c to the sensors 114a-114b. The distance OD may represent an updated size of the ego vehicle 50 that takes into account the distance that the vehicle attachments extend the ego vehicle 50. For example, the distance between the sensors 114a-114b and the rear end of the ego vehicle 50 may be one distance when the vehicle attachments are not present, and the distance between the sensors 114a-114b and the rear end of the ego vehicle 50 including the vehicle attachments may be another longer distance when the vehicle attachments are present. The distance OD may be an additional effective size of the ego vehicle 50 (e.g., from the perspective of the sensors 114a-114b) when the vehicle attachments are connected to the ego vehicle 50.

A dashed line 462 is shown. The dashed line may be a reference location that corresponds with a recalibrated sensor distance. In the example shown, the recalibrated sensor location 462 may be farther away from the ego vehicle 50 than the reference line 324 that corresponds with the default sensor detection location. The recalibrated sensor location 462 may be approximately the distance OD beyond the default detection range distance SD.

A distance (e.g., RD) is shown. The distance RD may represent the recalibrated sensor detection distance. The distance SD may represent the default detection range for the sensors 114a-114b (e.g., when no vehicle attachments are present). In response to detecting the vehicle attachments (e.g., the rack mount 410 and the bicycle 452), the default detection range distance SD may be extended by the object distance OD to be the recalibrated sensor detection distance RD.

The recalibrated sensor detection distance RD may be farther away from the ego vehicle 50 than the default detection distance SD. The recalibrated sensor detection distance RD may be extended away from the ego vehicle as far as the edge of the maximum detection region 320. For example, the recalibrated sensor detection distance RD may be limited to a maximum distance that the sensors 114a-114b may be capable of detecting the obstacles. In the example shown, the recalibrated sensor detection distance RD is shown relatively close to the edge of the maximum detection region 320. However, the recalibrated sensor detection distance RD may not necessarily be extended to the edge of the maximum detection region 320.

The recalibrated sensor detection distance RD may be determined in response to the distance D_VA (e.g., the distance of the vehicle attachments from the end of the ego vehicle 50) in order to accurately account for the extended size of the ego vehicle 50 when the vehicle attachments are connected. In some embodiments, the recalibrated sensor detection distance RD may comprise the extra buffer distance (e.g., to account for any portions of the vehicle attachments that may not be visible in the video frames used for the computer vision operations).

The recalibrated sensor detection distance RD may be used to extend the range of radar/ultra-sonic sensors 114a-114b. The recalibrated sensor detection distance RD may add a distance (e.g., the distance D_VA and/or the distance OD) to the default setting distance SD. The sensors 114a-114b may provide a warning that the ego vehicle 50 (including the vehicle attachment) may collide with an obstacle.

The distance determined by the computer vision operations may be added to the standard detection distance SD to provide the recalibrated sensor detection distance RD to provide a warning when the obstacle is within the distance RD of the ego vehicle 50.

In the example shown, the default sensor distance SD and the recalibrated sensor detection distance RD are shown directly to the rear of the ego vehicle 50. In some embodiments, the detection distance of the sensors 114a-114d may be extended in multiple directions. For example, if the vehicle attachment (e.g., the bicycle 452) longer than the width of the ego vehicle 50 (e.g., extends beyond the sides of the bumper), portions of the bicycle 452 may extend into the field of view 312a-312b of the lens 112f and/or the field of view 318a-318b of the lens 112d. In response to detecting the vehicle attachments using the side view cameras 102f and/or 102d, the processors 106a-106n may extend the detection range of the sensors 114a-114b outwards to the sides of the ego vehicle 50 (e.g., to account for a wide load being towed by the ego vehicle 50). For example, when the vehicle attachment is a wide load and extends into the field of view 318a-318b, the recalibrated sensor detection range may extend towards the vehicle 302b and the vehicle 302b may be the obstacle detected by the sensor 114b.

In the example shown, the bicycle 452 is shown attached to the rear bumper of the ego vehicle 50. In some embodiments, the bicycle 452 (or other types of vehicle attachments) may be mounted to a front end of the ego vehicle 50 (e.g., city buses implement front-mounted bike racks). Similar to detecting the vehicle attachments mounted the rear of the ego vehicle 50, the computer vision operations may be performed using the video frames generated using the pixel data captured by the lens 112e, the objects detected (if any) may be classified as a vehicle attachment, the distance D_VA may be calculated and the front sensors 114c-114d may be recalibrated to add the distance D_VA to the default sensor detection distance.

In some embodiments, the view from the lens 112c may provide sufficient data to classify the bicycle 452 as the vehicle attachment but may not capture the handlebars to provide the distance D_VA. A different one of the capture devices 102a-102n (e.g., the lens 112b) may provide a view from the roof of the ego vehicle 50 that may capture the handlebars. The processors 106a-106n may be configured to determine the distance from the lens 112b to the edge of the handlebars (or other farthest point on other types of vehicle attachments) at the reference location 460. The processors 106a-106n may determine a distance of the lens 112b (e.g., either using computer vision operations to the rear end of the ego vehicle 50, calculating a disparity between images captured by the lens 112c and the lens 112b to determine a distance, using specifications of the ego vehicle 50, etc.) to the lens 112c. The distance between the lens 112b and the lens 112c may be used to correlate the distance measured from the lens 112b to the reference location 460 with the measurements performed with respect to the lens 112c. By correlating the distances between two cameras at different locations, the processors 106a-106n may determine the distance D_VA in order to recalibrate the sensors 114a-114b.

Figure 7:
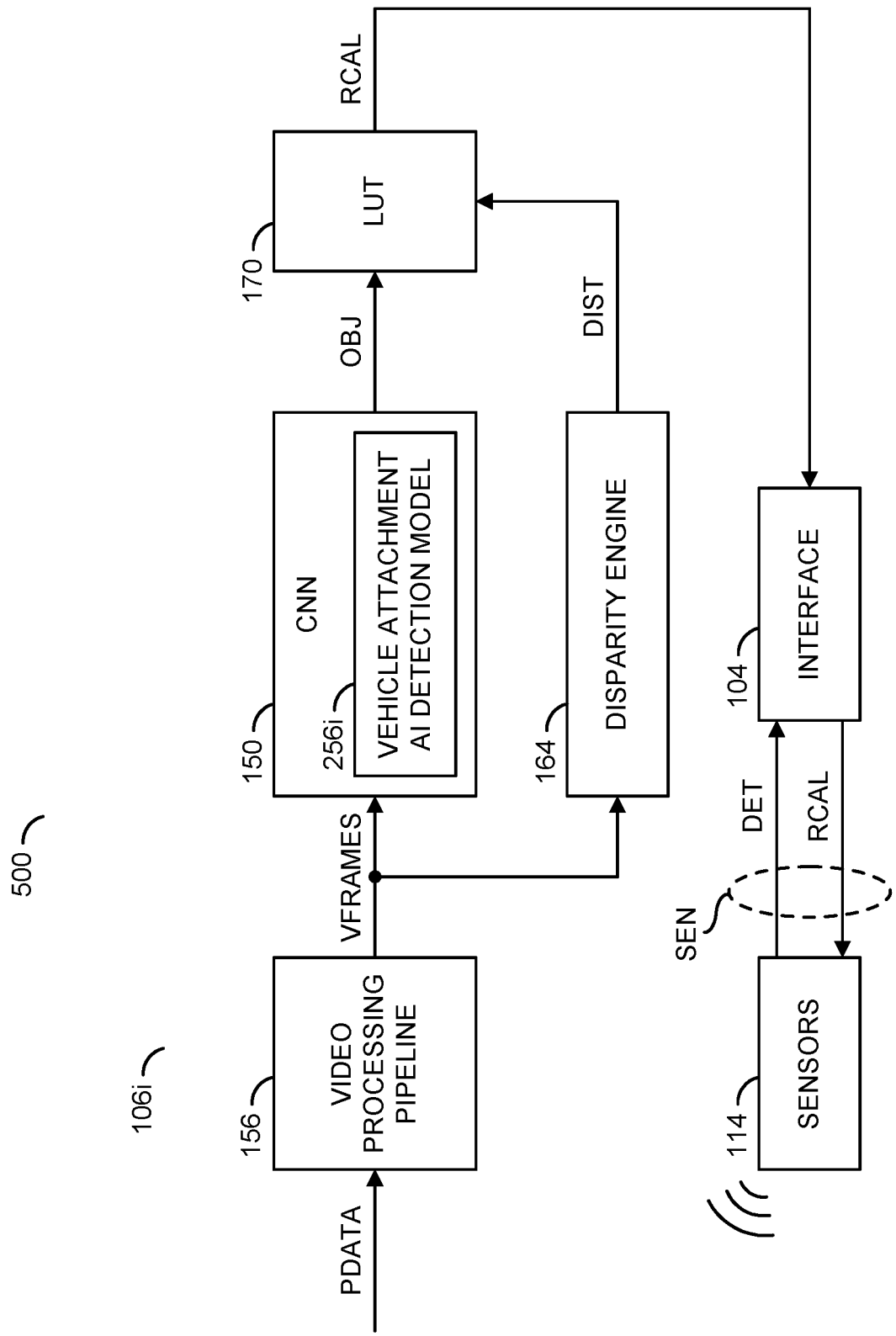
FIG. 7 is a block diagram illustrating recalibrating sensors in response to computer vision operations.

Referring to FIG. 7, a block diagram illustrating recalibrating sensors in response to computer vision operations is shown. A block diagram 500 is shown comprising a portion of the processor 106i. The processor 106i is shown as a representative example of any one of the processors 106a-106n.

The portion of the processor 106i may comprise the interface 104, the sensors 114, the CNN module 150, the video processing pipeline 156, the disparity engine 164 and/or the lookup table 170. A signal (e.g., PDATA) may be presented as input to the video processing pipeline 156. The signal PDATA may comprise pixel data received by the processor 106i. In an example, the pixel data PDATA may be provided in one or more of the signals FRAMES_A-FRAMES_N generated by the capture devices 102a-102n.

The video processing pipeline 156 may be configured to generate a signal (e.g., VFRAMES) in response to the pixel data PDATA. The signal VFRAMES may comprise the pixel data arranged as video frames. In an example, the video processing pipeline 156 may be configured to perform various preprocessing operations in order to generate the video frames VFRAMES that may be used for the computer vision operations. The video processing pipeline 156 may present the video frames VFRAMES to the CNN module 150 and/or the disparity engine 164.

In some embodiments, the disparity engine 164 may be configured to calculate a distance from the capture device (e.g., one of the capture devices 102a-102n) that captured the pixel data to the objects detected. In one example, where the capture devices 102a-102n are implemented as stereo camera pairs, the disparity engine 164 may be configured to determine a disparity between the two cameras in the stereo pair in order to generate disparity maps. In another example, where the capture devices 102a-102n are implemented as monocular cameras, results from computer vision operations and/or training data may be used with the pixel data captured by the monocular camera to generate depth maps. The depth maps generated may be used by the disparity engine 164 in order to calculate a distance to various locations in the captured video frame. The distances calculated using the disparity engines may be used to determine distances to the vehicle attachments. The disparity engine 164 may generate a signal (e.g., DIST). The signal DIST may comprise disparity maps and/or data that provides the distance measured to various objects.

The CNN module 150 may comprise the AI model 256i. The AI model 256i may be configured to detect vehicle attachments. The AI model 256i may comprise features and/or a DAG that may be optimized for detecting objects that correspond to vehicle attachments. The training data 252a-252n used to train the AI model 256i may comprise labeled video frames of vehicle attachments. The AI model 256i may be configured to make inferences about partial objects (e.g., the wheel 408a and the crank 408b) in order to determine partial objects correspond to an entire object (e.g., the bicycle 452). For example, the AI model 256i may provide features that may enable detecting portions of an object and inferring the whole object. The CNN module 150 may be configured to generate a signal (e.g., OBJ). The signal OBJ may comprise the results of the computer vision operations. The signal OBJ may comprise data about the locations, sizes and/or classifications of the vehicle attachments detected.

The lookup table 170 may receive the signal OBJ and the signal DIST. The lookup table 170 may comprise data corresponding to predefined objects (e.g., known objects). The predefined objects may comprise makes/models of vehicles, makes/models of bicycles, makes/models of the campers, makes/models of cargo carriers, makes/models of skis, makes/models of snowboards, etc. The data about the predefined objects may comprise information about details that may be used to determine a size of the vehicle attachments. In an example, the computer vision operations may detect a particular make/model of a bicycle and the lookup table 170 may comprise spatial dimensions for the particular make/model of the bicycle. In another example, the computer vision operations may detect a particular make/model of a cargo carrier and the lookup table 170 may comprise the spatial dimensions specific to the particular make/model of the cargo carrier. In some embodiments, the computer vision operations may detect a bicycle but may not be capable of determining the particular make/model of the detected bicycle. The lookup table 170 may comprise general dimensions for bicycles that may be used to infer the spatial dimension of the unknown make/model of bicycle. The type of data stored by the lookup table 170 in order to provide information about the sizes of various types of vehicle attachments may be varied according to the design criteria of a particular implementation.

The lookup table 170 may be configured to generate a signal (e.g., RCAL). The signal RCAL may be generated in response to the signal OBJ and the signal DIST. In an example, the lookup table 170 may use the information about the object provided in the signal OBJ to search for the spatial dimensions of the detected vehicle attachment. The lookup table 170 may use the spatial dimensions along with the distance calculated in the signal DIST in order to determine the actual distance that the vehicle attachment extends from the ego vehicle 50. The signal RCAL may comprise the actual distance that the vehicle attachment extends from the ego vehicle 50.

The interface 104 may receive the signal RCAL. The signal RCAL may comprise information about which of the sensors 114 to recalibrate (e.g., based on locations of the sensors 114 on the ego vehicle 50 and the location that the vehicle attachments have been mounted to the ego vehicle 50). The interface 104 may forward the signal RCAL to the sensors 114 that have been selected for recalibration.

The sensors 114 may be configured to recalibrate the detection distance from the default distance to the recalibrated distance provided in the signal RCAL. Using the recalibrated distance provided in the signal RCAL, the sensors 114 may be configured to detect obstacles near the ego vehicle 50 while accounting for the extended size of the ego vehicle 50 when the vehicle attachments are connected.

In response to monitoring for obstacles within the recalibrated sensor detection range, the sensors 114 may generate a notification when an obstacle is detected. The sensors 114 may be configured to generate a signal (e.g., DET). The sensors 114 may present the signal DET to the interface 104 when an obstacle is detected within the sensor detection range. For example, the signal DET may be generated when an obstacle is detected within the default sensor range SD when there are no vehicle attachments detected by the computer vision operations. In another example, the signal DET may be generated when an obstacle is detected within the recalibrated sensor range RD when there are vehicle attachments detected by the computer vision operations. In yet another example, the signal DET may be generated in response to any obstacle detected and the signal DET may provide a raw distance measurement value that may be analyzed by the processors 106a-106n. The signal DET and the signal RCAL may be communicated as parts of the signal SEN described in association with FIG. 1. The interface 104 may provide the signal DET to the processors 106a-106n. The processors 106a-106n may determine whether or not to generate the notification in response to the detection of the obstacles. In some embodiments, the interface 104 may generate the signal VCTRL to enable the actuators 116 to generate the notification in response to the signal DET.

Figure 8:
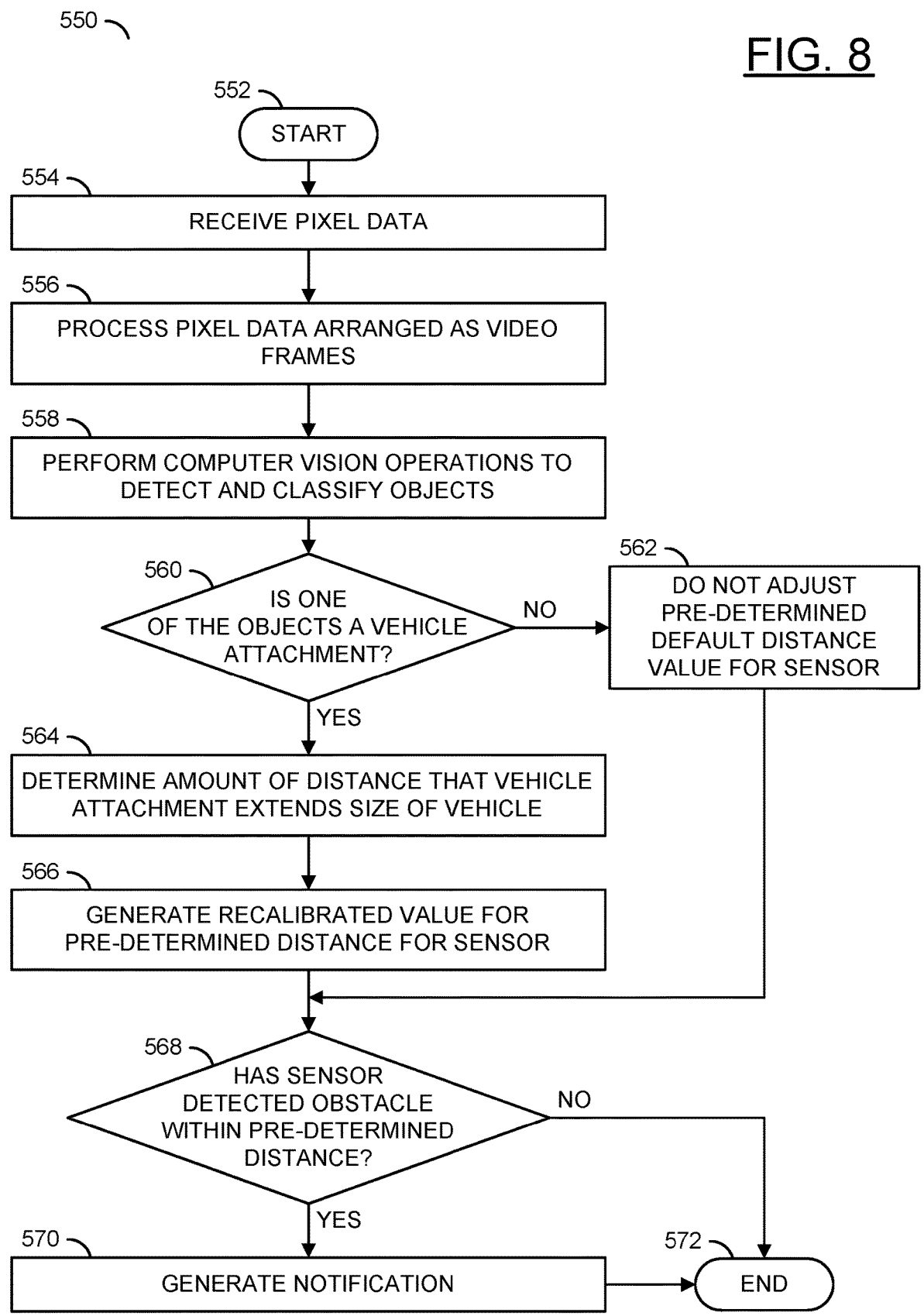
FIG. 8 is a flow diagram illustrating a method for dynamic adjustment of sensor range using computer vision.

Referring to FIG. 8, a method (or process) 550 is shown. The method 550 may perform dynamic adjustment of sensor range using computer vision. The method 550 generally comprises a step (or state) 552, a step (or state) 554, a step (or state) 556, a step (or state) 558, a decision step (or state) 560, a step (or state) 562, a step (or state) 564, a step (or state) 566, a decision step (or state) 568, a step (or state) 570, and a step (or state) 572.

The step 552 may start the method 550. In the step 554, the processors 106a-106n may receive the pixel data. In an example, the capture devices 102a-102n may generate the pixel data FRAMES_A-FRAMES_N in response to the focused light input signal IM_A-IM_N. Next, in the step 556, the processors 106a-106n process the pixel data arranged as video frames. In an example, the processors 106a-106n may receive the signals FRAMES_A-FRAMES_N comprising the pixel data arranged as the video frames (e.g., the video frame 400) and/or convert the pixel data in the signal PDATA into the signal VFRAMES. In the step 558, the processors 106a-106n may perform the computer vision operations to detect and/or classify objects. In an example, the CNN module 150 may analyze the video frames VFRAMES using the vehicle attachment AI detection model 256i to determine whether any features extracted from the video frames correspond to a vehicle attachment object. Next, the method 550 may move to the decision step 560.

In the decision step 560, the processors 106a-106n may determine whether one of the objects detected is a vehicle attachment. In an example, the vehicle attachment AI detection model 256i may compare features of the objects detected to known features of a vehicle attachment (e.g., a bike rack, a ski mount rack, a cargo carrier, a camera rig, etc.). If none of the objects detected are determined to be a vehicle attachment, then the method 550 may move to the step 562. In the step 562, the processors 106a-106n may not adjust the pre-determined distance value for the sensors 114a-114d from the default distance value. Next, the method 550 may move to the decision step 568.

In the decision step 560, if one or more of the objects detected are determined to be a vehicle attachment, then the method 550 may move to the step 564. In the step 564, the processors 106a-106n may determine the amount of distance D_VA that the vehicle attachment object extends the size of the ego vehicle 50. Next, in the step 566, the processors 106a-106n may generate a recalibrated value for the pre-determined distance for the sensor. For example, the recalibrated value for the distance may be the distance RD. Next, the method 550 may move to the decision step 568.

In the decision step 568, the processors 106a-106n may determine whether an obstacle has been detected within the pre-determined distance. For example, the sensors 114a-114d may use the default distance value SD for the pre-determined distance if no vehicle attachment was detected or use the recalibrated distance value RD if the vehicle attachment was detected. If no obstacle has been detected, then the method 550 may move to the step 572. If an obstacle has been detected, then the method 550 may move to the step 570. In the step 570, the processors 106a-106n may generate a notification. For example, the processors 106a-106n may generate the signal VCTRL, which may activate the actuators 116 (e.g., a speaker, haptic feedback, etc.). In another example, the processors 106a-106n may generate one of the signals VOUT_A-VOUT_N to display a visual notification on one or more of the displays 118a-118n. In yet another example, the processors 106a-106n may enable the interface 104 to generate the signal COM to enable the communication devices 110 to present the notification to another device. Next, the method 550 may move to the step 572. The step 572 may end the method 550.

Figure 9:
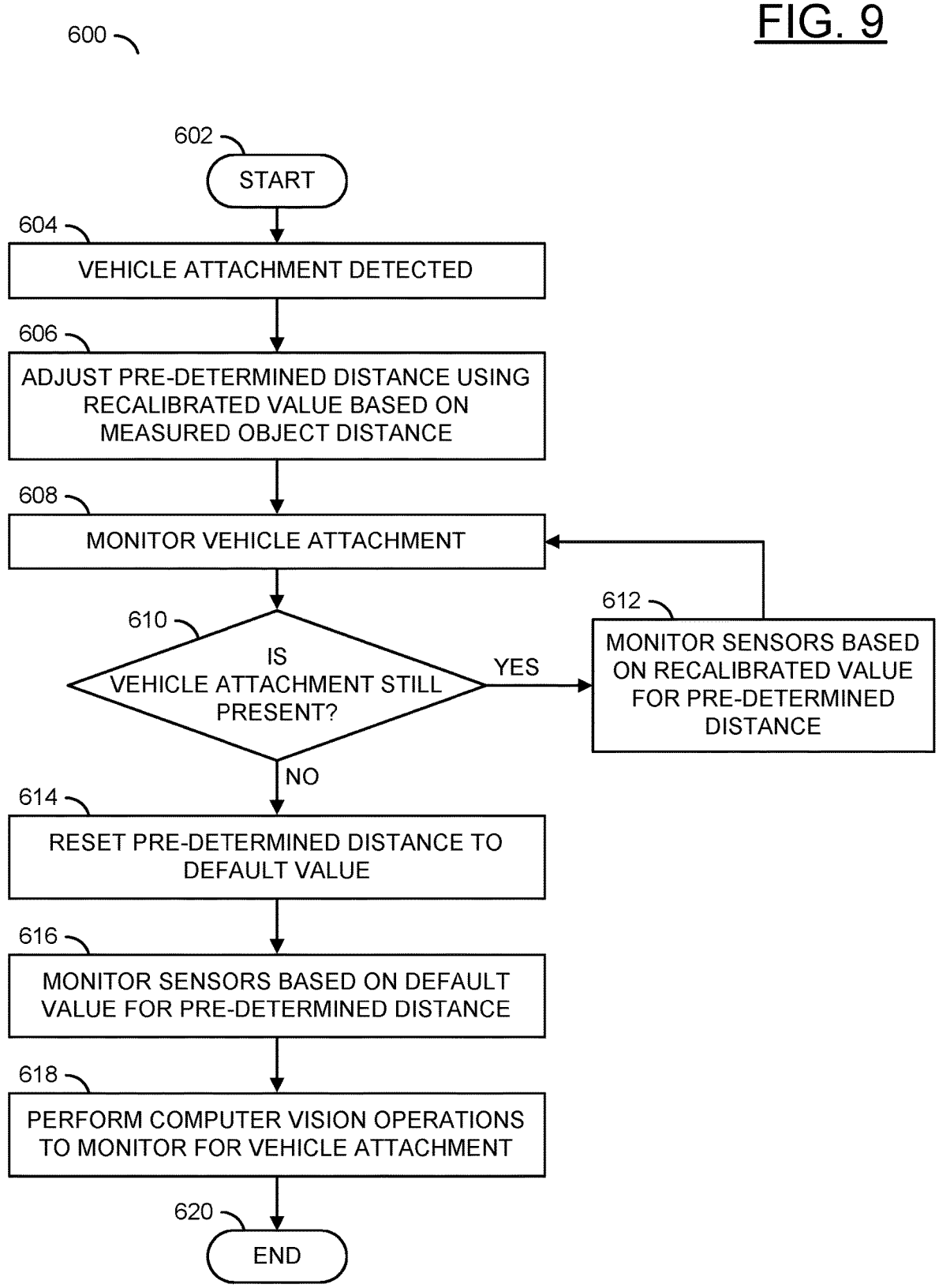
FIG. 9 is a flow diagram illustrating a method for resetting an adjustment of a sensor range when a vehicle attachment is no longer present.

Referring to FIG. 9, a method (or process) 600 is shown. The method 600 may reset an adjustment of a sensor range when a vehicle attachment is no longer present. The method 600 generally comprises a step (or state) 602, a step (or state) 604, a step (or state) 606, a step (or state) 608, a decision step (or state) 610, a step (or state) 612, a step (or state) 614, a step (or state) 616, a step (or state) 618, and a step (or state) 620.

The step 602 may start the method 600. In the step 604, the processors 106a-106n may detect the vehicle attachment (e.g., the rack mount 410). Next, in the step 606, the processors 106a-106n may adjust the pre-determined distance using the recalibration value RD based on the measured object distance D_VA. In the step 608, the processors 106a-106n may monitor the vehicle attachment. For example, the processors 106a-106n may continually and/or continuously generate the pixel data arranged as video frames and perform computer vision operations to detect objects and/or determine whether the objects detected correspond to a vehicle attachment. Next, the method 600 may move to the decision step 610.

In the decision step 610, the processors 106a-106n may determine whether the vehicle attachment is still present. For example, the processors 106a-106n may determine when the vehicle attachment has been removed by analyzing the pixel data (e.g., determine if the previously detected vehicle attachment is no longer detected in the video frames). If the vehicle attachment is still present, then the method 600 may move to the step 612. In the step 612, the processors 106a-106n may monitor the sensors 114a-114d using the recalibrated value RD for the pre-determined distance. Next, the method 600 may return to the step 608. In the decision step 610, if the vehicle attachment is no longer present, then the method 600 may move to the step 614.

In the step 614, the processors 106a-106n may reset the pre-determined distance for the sensors 114a-114d to the default distance value SD. For example, the processors 106a-106n may reset the sensors 114a-114d that had been adjusted based on the presence of the vehicle attachment (e.g., other sensors 114a-114d that are not affected by the vehicle attachment may be adjusted and/or reset separately). Next, in the step 616, the processors 106a-106n may monitor the sensors 114a-114d for obstacles within the pre-determined distance based on the default distance value SD. In the step 618, the processors 106a-106n may perform the computer vision operations to monitor for the presence of a vehicle attachment. For example, if a vehicle attachment is detected, then the method 600 may return to the step 604 and the method 600 may be repeated. Next, the method 600 may move to the step 620. The step 620 may end the method 600.

Referring to FIG. 10, a method (or process) 650 is shown. The method 650 may determine a distance of a vehicle attachment from a rear end of a vehicle. The method 650 generally comprises a step (or state) 652, a step (or state) 654, a decision step (or state) 656, a step (or state) 658, a step (or state) 660, a decision step (or state) 662, a step (or state) 664, a decision step (or state) 666, a step (or state) 668, a step (or state) 670, a step (or state) 672, a step (or state) 674, and a step (or state) 676.

The step 652 may start the method 600. In the step 654, the vehicle attachment may be detected in response to the computer vision operations. Next, in the decision step 656, the processors 106a-106n may determine whether the field of view of one of the capture devices 102a-102n that provided the pixel data of the vehicle attachment (e.g., the rear mounted capture device 112c) provides a full view of the object for distance measurement. In an example, the CNN module 150 may determine whether the vehicle attachment is completely shown in the video frame 400 (e.g., to determine the outermost point of the vehicle attachment for determining the distance D_VA). If the vehicle attachment is fully shown in the video frame, then the method 650 may move to the step 658. In the step 658, the processors 106a-106n may use the distance measurement D_VA for the recalibrated value for the sensors 114a-114d. Next, the method 650 may move to the step 676.

In the decision step 656, if the vehicle attachment is not fully shown in the video frame, then the method 650 may move to the step 660. In the step 660, the processors 106a-106n may search the LUT 170 for the object dimensions of the vehicle attachment detected. For example, the CNN module 150 may classify the vehicle attachment as a particular type of object and/or a specific make/model of an object and the LUT 170 may be searched based on the object classification. Next, the method 650 may move to the decision step 662.

In the decision step 662, the processors 106a-106n may determine whether the vehicle attachment object classification is in the LUT 170. If the object class is in the LUT 170, then the method 650 may move to the step 664. In the step 664, the processors 106a-106n may use the known size of the object and the distance measurement D_VA to determine the recalibrated value for the sensors 114a-114d. Next, the method 650 may move to the step 676. In the decision step 662, if the object class of the vehicle attachment is not in the LUT 170, then the method 650 may move to the decision step 666.

In the decision step 666, the processors 106a-106n may determine whether another of the capture devices 102a-102n provide a view of the vehicle attachment. For example, the roof mounted camera 102b may provide a partial view of the vehicle attachment in addition to the rear mounted camera 102c. If a second camera does provide a second view of the vehicle attachment, then the method 650 may move to the step 668. In the step 668, the processors 106a-106n may combine both views of the vehicle attachment to determine the distance D_VA. For example, the disparity engine 164, may be configured to compensate for the different distances of the two cameras in order to determine the distance D_VA. Next, in the step 670, the processors 106a-106n may use the distance measurement from the combined view for the recalibrated value for the sensors 114a-114d. Next, the method 650 may move to the step 676.

In the decision step 666, if a second camera does not provide an additional view of the vehicle attachment, then the method 650 may move to the step 672. In the step 672, the processors 106a-106n may estimate the distance D_VA (e.g., based on the portions of the vehicle attachment that are visible), and add a buffer value (e.g., an additional amount of distance). Next, in the step 674, the processors 106a-106n may use the estimated distance plus the buffer value for the recalibrated value for the sensors 114a-114d. Next, the method 650 may move to the step 676. The step 676 may end the method 650.

Referring to FIG. 11, a method (or process) 700 is shown. The method 700 may disable sensors obstructed by a vehicle attachment. The method 700 generally comprises a step (or state) 702, a step (or state) 704, a step (or state) 706, a step (or state) 708, a decision step (or state) 710, a step (or state)

712, a step (or state) 714, a step (or state) 716, a decision step (or state) 718, a step (or state) 720, and a step (or state) 722.

The step 702 may start the method 700. In the step 704, the vehicle attachment may be detected by the processors 106a-106n in response to the computer vision operations. Next, in the step 706, the CNN module 150 may determine the view around the vehicle attachment and/or the shape and size of the vehicle attachment. In the step 708, the processors 106a-106n may compare the shape and size of the vehicle attachment with the field of view of the sensors 114a-114d. In an example, the LUT 170 store a correlation between the field of view of the sensors 114a-114d (e.g., the maximum sensor range 320) and the field of view of the capture devices 102a-102n to enable a comparison between a range of coverage of the cameras and a range of coverage of the sensors 114a-114d. The comparison between the cameras and the coverage of the sensors may enable the processors 106a-106n to determine if the vehicle attachment would potentially block the sensors 114a-114d. Next, the method 700 may move to the decision step 710.

In the decision step 710, the processors 106a-106n may determine whether the vehicle attachment obstructs the sensors 114a-114d. For example, a large sized object (e.g., a camper attachment being towed by the ego vehicle 50) may entirely or partially block the sensors 114a-114d, which may cause the sensors 114a-114d to be ineffective for proximity detection of the obstacles. If the vehicle attachment does not obstruct the sensors 114a-114d, then the method 700 may move to the step 712. In the step 712, the processors 106a-106n may measure the distance of the vehicle attachment D_VA to determine the recalibration value RD. Next, in the step 714, the processors 106a-106n may monitor the detections made by the sensors 114a-114d using the recalibration value RD. Next, the method 700 may move to the step 722.

In the decision step 710, if the vehicle attachment is determined to obstruct the sensors 114a-114d, then the method 700 may move to the step 716. In the step 716, the processors 106a-106n may disable the sensors 114a-114d that may be obstructed by the vehicle attachment. For example, other of the sensors 114a-114d may remain active (e.g., the front sensors 114c-114d may not be affected by a large vehicle attachment being towed to the rear of the ego vehicle 50). The sensors 114a-114d that are disabled may only be disabled temporarily (e.g., while the large vehicle attachment is present) and may be reactivated when the vehicle attachment is no longer present. Next, the method 700 may move to the decision step 718.

In the decision step 718, the processors 106a-106n may determine whether other sensors are implemented on the vehicle attachment. In an example, a camper that is being towed by the ego vehicle 50 may implement a proximity sensor that provides similar functionality to the sensors 114a-114d. The additional proximity sensor on the vehicle attachment may send data to the processors 106a-106n (e.g., wirelessly, over a wired connection, etc.). For example, data from the additional proximity sensor may communicate data over a cable connection that also provides a connector for activating brake lights on a camper. If there are no additional proximity sensors, then the method 700 may move to the step 722. If there are additional proximity sensors, then the method 700 may move to the step 720. In the step 720, the processors 106a-106n may bypass the sensors 114a-114d that are obstructed by the vehicle attachment and instead receive input about obstacles from the additional sensors on the vehicle attachment. Next, the method 700 may move to the step 722. The step 722 may end the method 700.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive pixel data corresponding to an exterior of a vehicle;
a sensor configured to detect an obstacle at a pre-determined distance from said vehicle; and
a processor configured to (i) process said pixel data arranged as video frames, (ii) perform computer vision operations on said video frames to detect objects in said video frames, (iii) determine whether one of said objects detected is a vehicle attachment, (iv) determine an amount of distance that said vehicle attachment extends a size of said vehicle and (v) generate a recalibrated value for said pre-determined distance from said vehicle used by said sensor for detecting said obstacle in response to said amount of said distance, wherein
(i) a notification is generated in response to said sensor detecting said obstacle within said pre-determined distance, and
(ii) said pre-determined distance is (a) a default value based on said size of said vehicle when said vehicle attachment is not present and (b) said recalibrated value when said vehicle attachment is detected.

2. The apparatus according to claim 1, wherein said vehicle attachment comprises a bike rack.

3. The apparatus according to claim 2, wherein (i) said bike rack is mounted to a rear-end of said vehicle, (ii) said pixel data of said bike rack is captured using a rear-mounted vehicle camera and (iii) said size of said vehicle is extended by adding said amount of said distance to said rear-end of said vehicle.

4. The apparatus according to claim 1, wherein said apparatus is configured to implement a dynamic adjustment of a sensor range using said computer vision operations.

5. The apparatus according to claim 1, wherein (i) said sensor is a radar sensor and (ii) said notification is generated in response to said radar sensor detecting a proximity of said obstacle without capturing said pixel data.

6. The apparatus according to claim 1, wherein (i) said sensor is an ultrasonic sensor and (ii) said notification is generated in response to said ultrasonic sensor detecting a proximity of said obstacle without capturing said pixel data.

7. The apparatus according to claim 1, wherein said vehicle attachment is attached to a tow hitch of said vehicle.

8. The apparatus according to claim 1, wherein said recalibrated value for said pre-determined distance prevents said notification from being generated when said sensor detects said vehicle attachment as said obstacle within said default value of said pre-determined distance from said vehicle.

9. The apparatus according to claim 1, wherein said pixel data is captured using a front-mounted, advanced driver assistance systems (ADAS) camera.

10. The apparatus according to claim 9, wherein (i) said vehicle is a bus, (ii) said vehicle attachment is a bike rack mounted to a front of said bus and (iii) said size of said bus is extended by adding said amount of said distance to said front of said bus using said recalibrated value.

11. The apparatus according to claim 1, wherein said processor is configured to reset said pre-determined distance to said default value when said vehicle attachment is no longer detected.

12. The apparatus according to claim 1, wherein said vehicle attachment comprises a cargo carrier.

13. The apparatus according to claim 1, wherein (i) said processor is further configured to add a buffer distance to said amount of said distance and (ii) said buffer distance is implemented to account for portions of said vehicle attachment that is not captured in said video frames.

14. The apparatus according to claim 1, further comprising a lookup table, wherein (i) said lookup table comprises spatial dimensions of various vehicle attachments, (ii) said processor is configured to compare said vehicle attachment detected to said spatial dimensions of said various vehicle attachments and (iii) said amount of said distance is determined in response to (a) a distance measured using said computer vision operations and (b) said spatial dimensions in said lookup table.

15. The apparatus according to claim 1, wherein (i) said interface receives said pixel data from a first capture device and a second capture device (ii) said computer vision operations performed on said video frames generated from said pixel data from said first capture device detect a first portion of said vehicle attachment, (iii) said computer vision operations performed on said video frames generated from said pixel data from said second capture device detect a second portion of said vehicle attachment and (iv) said processor is configured to determine said amount of said distance by (a) determining whether said first portion or said second portion of said vehicle attachment extends farthest from said vehicle and (b) compensating for a difference in location of said first capture device and said second capture device.

16. The apparatus according to claim 1, wherein said processor is further configured to (i) determine a shape and size of said vehicle attachment and (ii) perform a comparison of said shape and size of said vehicle attachment with a field of view of said sensor.

17. The apparatus according to claim 16, wherein said processor is further configured to disable said sensor if said comparison of said shape and size of said vehicle attachment with said field of view of said sensor determines that said vehicle attachment obstructs said field of view of said sensor.

18. The apparatus according to claim 17, wherein said processor is further configured to bypass said sensor when said vehicle attachment obstructs said field of view of said sensor and receive input from a second sensor implemented on said vehicle attachment to detect said obstacle.

19. The apparatus according to claim 1, wherein said vehicle attachment comprises a ski mount.

20. The apparatus according to claim 1, wherein said processor is further configured to limit a search region for said vehicle attachment in said video frames to a region within a particular distance from said vehicle.

* * * * *